United States Patent [19]

Buddemeyer et al.

[11] 4,351,735
[45] * Sep. 28, 1982

[54] MINERAL ENRICHMENT COMPOSITION AND METHOD OF PREPARING SAME

[75] Inventors: Bruce D. Buddemeyer; William A. Neville; Nancy A. Rozzo; Richard G. Bourne, all of Kansas City, Mo.

[73] Assignee: R.G.B. Laboratories Inc., Kansas City, Mo.

[*] Notice: The portion of the term of this patent subsequent to Jul. 29, 1997, has been disclaimed.

[21] Appl. No.: 166,460

[22] Filed: Jul. 7, 1980

Related U.S. Application Data

[63] Continuation-in-part of Ser. No. 970,935, Dec. 19, 1978, Pat. No. 4,214,996.

[51] Int. Cl.$^3$ .............................................. A23L 1/30
[52] U.S. Cl. .......................................... 252/1; 71/27; 260/429 R; 260/429.5; 260/429.7; 260/430; 260/431; 260/432; 260/435 R; 260/438.5 R; 260/439 R; 260/440; 260/446; 260/447; 260/448 R; 260/545 P; 556/404; 426/74; 426/531
[58] Field of Search .................... 71/27; 252/1; 260/429 R, 429.5, 429.7, 430, 431, 432, 435 R, 438.1, 438.5 R, 439 R, 440, 441, 446, 447, 448 R, 545 P; 426/74, 531; 556/404

[56] References Cited

U.S. PATENT DOCUMENTS

| | | | |
|---|---|---|---|
| 3,692,529 | 9/1972 | Rychman | 252/1 |
| 3,794,740 | 2/1974 | Achorn et al. | 426/69 X |
| 4,141,714 | 2/1979 | Mues et al. | 71/27 |
| 4,152,271 | 5/1979 | Eisenberg | 426/74 X |
| 4,214,996 | 7/1980 | Buddemeyer et al. | 252/1 |

*Primary Examiner*—Leland A. Sebastian

*Attorney, Agent, or Firm*—Schmidt, Johnson, Hovey & Williams

[57] ABSTRACT

Mineral-containing polymeric compositions of matter having high aqueous dispersibility, and methods of synthesizing the same, are disclosed which permit nutritionally important elements such as calcium, magnesium, phosphorus, potassium, iron and certain trace elements to be added in aqueous form to foods of all types without adversely affecting taste qualities. The compositions generally are high molecular weight species having moieties of the generalized formula

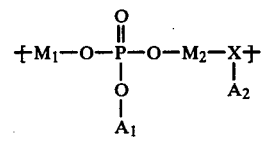

wherein $M_1$ and $M_2$ are polyvalent metals, $A_1$ and $A_2$ are respectively taken from the group consisting of hydrogen, ammonium and the alkali metals, and X is an organic acid moiety having at least three carboxyl groups therein (preferably citrate). The synthesis preferably includes the steps of admixing in water a metal cation source, a potassium phosphate source and an organic acid, followed by heating and further agitation. Dispersibility of the compositions is enhanced by the use of adjuncts such as hydroxyl sources (e.g., sugars, starches or the like), or amino acids, whey, and caseinates. Edible forms of the compositions hereof find particular utility as nutritional fortificants in traditional or ersatz foods, either for human or animal consumption; in addition, the compositions may be very useful in fertigation or foliar plant nutrition programs where minerals are applied to the soil and/or emergent plants. Nonedible forms can be useful in virtually any context wherein dispersibility is desirable.

34 Claims, No Drawings

MINERAL ENRICHMENT COMPOSITION AND METHOD OF PREPARING SAME

This is a continuation-in-part application of Ser. No. 970,935, filed Dec. 19, 1978, now U.S. Pat. No. 4,214,996.

BACKGROUND OF THE INVENTION

1. Field of the Invention

The present invention is concerned with novel mineral-containing polymeric compositions of matter which are highly useful as enrichments for foods and the like. More particularly, it is concerned with such compositions and methods of synthesis thereof, wherein the compositions exhibit very high dispersibility in aqueous media, thereby rendering the compositions useful as fortificants in a wide variety of applications.

2. Description of the Prior Art

The food industry has long sought stable water-dispersible forms of calcium, magnesium, phosphorus, potassium, iron and other trace elements in order that significant amounts of these essential nutrients can be introduced into food systems without adding attendant superfluous bulk. To be effective in such contexts, the mineral-containing substances must be essentially odorless, colorless, tasteless, and be produceable at modest cost. In addition, such products must exhibit stability when subjected to the condition extremes dictated by formulation, processing and storage.

In the past several years, fabricated foods have been rapidly increasing in number, and their appeal has increased because of enhanced organoleptic properties, convenience, and economic and nutritional values. For example, a variety of fabricated (non-dairy) foods exemplified by margarine, imitation ice cream, non-dairy creamers, whipped topping mixes and prewhipped toppings have made a major impact on sales of counterpart traditional foods and beverages. Similarly, there is increasing acceptance in the marketplace for non-dairy milks which may be completely free of milk protein.

A major problem confronting the fabricated food industry is in designing or formulating products which are essentially equal to their natural counterparts on a nutritional basis, particularly with respect to mineral content. For example, in the case of non-dairy milks it has heretofore been impossible to provide the desired amounts of calcium, inasmuch as there has been no relatively inexpensive and readily available calcium-containing composition which will remain in aqueous dispersion. As can be appreciated, it does little good to supply a calcium source with a non-dairy milk if the calcium simply precipitates to the bottom of the container and is never ingested. The problem of solubility or dispersibility in aqueous media is also present to a greater or lesser degree with respect to other vital nutrients such as magnesium, iron, copper, boron, zinc, manganese and molybdenum, and therefore use of these nutrients has been limited in fabricated foods.

It has also been suggested in the past that significant nutritional benefits could be gained if vital mineral nutrients were applied directly to the soil during irrigation procedures so that plants growing in the soil could take up the nutrients. Such a procedure has come to be called "fertigation." However, such proposals have found only limited use in the past for the reasons outlined above, i.e., lack of mineral-containing compositions which have adequate dispersibility in aqueous media.

The products of the invention also have utility in connection with solid foods. For example, they may be sprayed onto virtually any solid foods for nutritional fortification purposes. In addition, various metal-containing compositions in accordance with the invention should be useful in drug, cosmetic or other chemical applications where the presence of metals is desired.

U.S. Pat. Nos. 3,428,624 and 3,375,168 describe, respectively, the production of calcium sugar phosphates and water soluble phosphate compositions. However, the products described in these patents are not believed to have been successful in the marketplace, and certainly have not solved the problems outlined above.

SUMMARY OF THE INVENTION

In its broadest aspects, the present invention is concerned with compositions of matter which are generally of polymeric or quasi-polymeric form and it is theorized that they have high molecular weights of at least about 300,000. The compositions contain polyvalent cations taken from the group consisting of calcium, magnesium, zinc, iron, nickel, copper, boron, manganese, molybdenum, arsenic, silver, aluminum, barium, bismuth, mercury, lead, antimony, tin, beryllium, cadmium, cobalt, chromium, selenium, silicon, strontium, titanium and vanadium and surprisingly exhibit high degrees of dispersibility or solubility in aqueous media. The compositions also include an organic acid moiety having at least three carboxyl groups therein, such as a citrate moiety; other acids may include HEEDTA (N-hydroxyethyl ethylenediaminetetraacetic acid) and DTPA (diethylenetriaminepentaacetic acid). In some instances adjuncts such as malto-dextrins and corn syrup, ranging in D.E. from 1-100, sucrose, dextrose, galactose, arabinose, ribose, xylose, maltose, lactose, raffinose, fructose, polyalcohols, i.e., glycerin or propylene glycol can be associated with the overall compositions to give an increase in dispersibility. Additional adjuncts found to be useful include the amino acids, starches, whey, the caseinates, and hydrolyzates of animal, vegetable and marine protein sources. Other specific adjuncts may include APCA (ethylene-bis(alpha-imino-ortho-hydroxyphenylacetic acid)) and NN-bis-(2-hydroxy-5-sulfobenzyl) glycine.

A method of synthesis of the mineral-containing compositions is also in the ambit of the invention, and broadly comprises the steps of admixing, in water, a cation source, a hydrogen, alkali metal or ammonium phosphate source, and an organic acid having at least three carboxyl groups therein. The molar ratio of the hydrogen, ammonium and/or alkali metal ions to phosphate ions is preferably within the range of from about 1:1 to 6:1. The final step in the process involves heating the admixture for a sufficient period of time and at a temperature to yield water-dispersible products. Such products can be stored for relatively long periods of time at varying temperature conditions while nevertheless maintaining the desirable dispersibility in water or other aqueous media, particularly when kept under relatively sterile conditions.

DESCRIPTION OF THE PREFERRED EMBODIMENTS

Mineral-containing compositions in accordance with the present invention include a moiety of the generalized formula

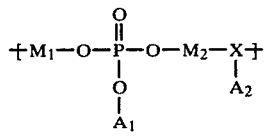

wherein $M_1$ and $M_2$ are respectively taken from the group consisting of calcium, magnesium, zinc, iron, nickel, copper, boron, manganese, molybdenum, arsenic, silver, aluminum, barium, bismuth, mercury, lead, antimony, tin, beryllium, cadmium, cobalt, chromium, selenium, silicon, strontium, titanium and vanadium, $A_1$ and $A_2$ are respectively taken from the group consisting of hydrogen, ammonium and the alkali metals, and X is an organic acid moiety having at least three carboxyl groups therein.

In preferred forms, $A_1$ and $A_2$ are respectively taken from the group consisting of hydrogen, ammonium, lithium, potassium and sodium, and said acid moiety is a citrate moiety of the formula

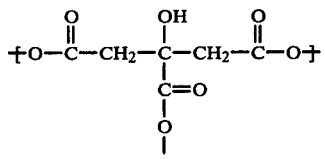

so that the overall moiety, in the most preferred form, has the following generalized formula:

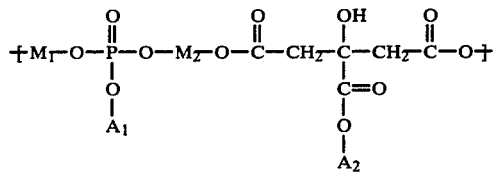

Analyses of the compositions of the invention have indicated that the compositions are quite ionic in character. Thus, the generalized formulae I and III may be more properly written as follows:

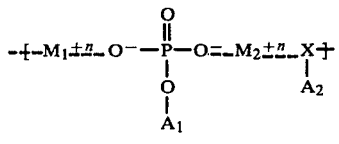

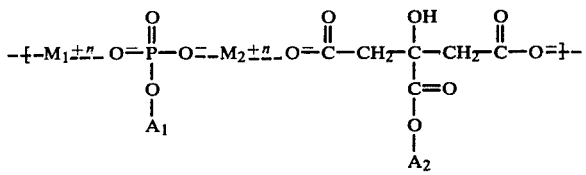

wherein n is at least 2.

The dotted line representations illustrated in formula (Ia) and (IIIa) are intended to indicate an ionic-type attraction, as opposed to a classical covalent bonding situation.

Although formula (Ia) and (IIIa) have been provided for completeness, and to depict what may be the proper bonding structure, it is to be understood that the invention is in no way limited to ionic or covalent bonding, or any theory relating thereto; rather, the compositions of the invention are best illustrated in a generalized way by formulae (I) and (III), which are intended to be generic to the corresponding formulae (Ia) and (IIIa).

In particularly preferred forms, the compositions of matter are in the form of polymers or quasi-polymers having a molecular weight exceeding about 300,000, with the depicted moieties, or analogs thereof, being recurrent throughout the compositions.

As is demonstrated in the Examples below, the compositions in accordance with the present invention exhibit surprising and very high dispersibilities in water or other aqueous media. Generally speaking, the compositions of the invention should exhibit an aqueous dispersibility such that at least about 30% by weight of the theoretically available, non-alkali metal cations present therein are dispersed in water at ambient temperature.

In preparative procedures, cation-containing products of the invention having high degrees of dispersibility are made by first forming an admixture in water of respective quantities of: (1) a cation source selected from the group consisting of compounds of calcium, magnesium, iron, copper, boron, zinc, manganese, molybdenum, arsenic, silver, aluminum, barium, bismuth, mercury, nickel, lead, antimony, tin, beryllium, cadmium, cobalt, chromium, selenium, silicon, strontium, titanium and vanadium; (2) a hydrogen, alkali metal or ammonium phosphate source, most preferably selected from the group consisting of potassium phosphate, dipotassium hydrogen phosphate, a mixture of ammonium and/or potassium hydroxide and phosphoric acid, and potassium dihydrogen phosphate; and (3) an organic acid having at least three carboxyl groups therein.

The molar ratios of the starting materials should preferably be as follows: for phosphate ion to acid, from about 0.5:1 to 3:1, most preferably about 1:1; for hydrogen, alkali metal and/or ammonium ions to phosphate ions, from about 1:1 to 6:1, most preferably about 2:1; for non-alkali metal cations to phosphate, from about 0.5:1 to 3:1, most preferably about 2:1; for non-alkali metal cations to acid, from about 1:1 to 5:1, most preferably about 2:1; and for hydrogen, alkali metal and/or ammonium ions to acid, from about 0.5:1 to 7:1, most preferably about 2:1. In addition, for best results the starting admixture should be stoichiometrically balanced to achieve the desired end composition.

The next and final step of the method involves simply heating the admixture for a sufficient period of time and at a temperature to yield the desired products. Preferably, this involves heating the admixture to a temperature of from about 150° to 400° F., and thereafter further admixing the admixture at this temperature for a period of from about 10 minutes to 7 hours, more preferably for a period of from 10 to 60 minutes.

A wide variety of adjuncts have been found useful for incorporation with the compositions of matter of the invention. Such adjuncts include the amino acids, whey, the caseinates, sugars and starches. These adjuncts serve to enhance the aqueous dispersibility of the mineral compositions.

In cases where a preferred hydroxyl-containing adjunct such as corn syrup, glycerine, sucrose or dextrose is used, this should be added cold with the initial ingredients with thorough mixing. In most cases the initial admixture should contain at least about 60 percent by weight water, and in many instances significantly more than this figure. Although not absolutely critical to the production of desired compositions, it has been found desirable to add the respective components of the admixture by first adding the cation source to water followed by a period of mixing of from about 1 to 5 minutes; then adding the alkali metal phosphate source with mixing for a period of from about 1 to 5 minutes; and finally addition of the organic acid (preferably citric acid) with mixing for a period of from about 1 to 5 minutes. At the end of this stepwise addition and mixing process, the described heating and further mixing step can be effected.

If it is desired to produce a dry, reconstitutable product, it is generally preferred to homogenize the aqueous product or subject it to high shear mixing followed by drying (e.g., spray drying or drum drying). The resultant solid or granular product can be reconstituted in aqueous media and exhibits substantially identical dispersibility properties as compared with the original liquid.

The products of the present invention can be stored virtually indefinitely without loss of their desirable properties, and are admirably suited as fortificants in connection with fabricated human or animal foods such as non-dairy milks and the like. In addition, the products have significant utility as fertigation or foliar plant nutritional agents.

The following Examples illustrate the compositions of the present invention, methods for synthesizing same, as well as the utility thereof. However, nothing in the following Examples should be taken as a limitation upon the overall scope of the invention.

EXAMPLE 1

A water dispersible mineral enrichment composition was made using the ingredients set forth in Table I below. Each ingredient was added in the order listed in Table I to a 2 liter glass beaker, and the ingredients were stirred with a high shear "Tekmar" mixer throughout the synthesis. During the initial blending, the beaker was placed in an ice water bath to prevent extreme temperature rise. The temperature at each addition and the mixing times are noted in Table I.

The pH of the composition after initial blending was 6.75. The composition was then heated in a hot water bath over a hot plate while mixing was continued. This treatment was continued for approximately 35 minutes until a temperature of 180° was reached. The pH of the mixture at this time was 6.45.

A portion of this composition was placed in a sterilized bottle. The composition was semitransparent and hazy white in color, and appeared homogeneous throughout. Another portion was placed in a bottle and heated in a pressure cooker at 250° F. (15 p.s.i. steam pressure) for 15 minutes. This preparation was yellow in color and more transparent than the former sample, although a very slight haziness was observed.

These two samples were stored overnight at 45° F.; no precipitation was present and the samples appeared slightly less hazy than previously.

TABLE I

| Moles | Weight % (dry) | Weight % (actual) | Ingredient | Gms. | Temp. at Addition | Mixing Time to Next Addition |
|---|---|---|---|---|---|---|
| 42.917 | | 77.32 | Water | 773.2 | | |
| .364 | 85.65 | 20.00 | 36 D.E. Corn Syrup | 200.0 | 76° F. | 10 Min. |
| .050 | 1.98 | .37 | Calcium Hydroxide | 3.7 | 77.5° F. | 5 Min. |
| .033 | 1.02 | .19 | Magnesium Hydroxide | 1.9 | 82° F. | 5 Min. |
| .064 | 6.00 | 1.12 | Dipotassium Phosphate | 11.2 | 81° F. | 5 Min. |
| .048 | 5.35 | 1.00 | Citric Acid Anhydrous | 10.0 | 84° F. | 10 Min. |

A portion of the 250° sample was filtered through activated charcoal; the substance was no longer yellow and appeared identical to the 180° sample.

EXAMPLE 2

The composition was prepared as described in Example 1. After mixing at room temperature, (maintained by ice/water bath) the pH was 6.7.

The composition was then heated to 180° F. (over approximately 30 minutes). The pH at this time was 6.65.

A sample taken after heating exhibited, after a few minutes at room temperature, a semitransparent upper layer, a dense cloudy layer, and a small amount of a white powdery precipitate.

Another sample was heated to 250° in a pressure cooker (15 psi pressure). This sample was similar in appearance to the previous one except that the upper layer was less transparent (more cloudy).

After remaining at room temperature for about five days, the 180° F. sample exhibited a white flocculent layer filling approximately the bottom 40% of the container. The single upper layer was nearly transparent.

The 250° F. sample at this time appeared to be a nearly homogeneous translucent fluid with a very small amount of white precipitate.

The compositions described in Examples 1 and 2 are useful from a nutritional standpoint for mineral fortification of foods for general consumption such as juices, carbonated and noncarbonate beverages, dairy analogs, soups, broths and other foods in which insoluble minerals are unfeasible. Other areas of application would be in infant formulas, pet foods, animal feeds, special dietary supplements or in a mineral "tonic", use as a fertilizer and as a catalyst in chemical reactions.

The compositions are capable of being spray dried, drum dried, vacuum dried or otherwise dehydrated and are then readily soluble or dispersible in a wide variety of aqueous media. They can be designed to provide a portion or all of the RDA of calcium, magnesium, iron, copper, zinc and phosphorus while having a little or no effect on the taste or physical characteristics of the product to which it is added.

TABLE II

| Moles | Weight % (dry) | Weight % (actual) | Ingredient | Gms. | Temp. at Addition | Mixing Time to Next Addition |
|---|---|---|---|---|---|---|
| 42.917 | | 96.65 | Water | 773.2 | | |

TABLE II-continued

| Moles | Weight % (dry) | (actual) | Ingredient | Gms. | Temp. at Addition | Mixing Time to Next Addition |
|---|---|---|---|---|---|---|
| .050 | 13.82 | .46 | Calcium Hydroxide | 3.7 | 80° F. | 5 Min. |
| .033 | 7.08 | .24 | Magnesium Hydroxide | 1.9 | 85° F. | 5 Min. |
| .064 | 41.79 | 1.40 | Dipotassium Phosphate | 11.2 | 87° F. | 5 Min. |
| .048 | 37.31 | 1.25 | Citric Acid Anhydrous | 10.0 | 84° F. | 10 Min. |

EXAMPLE 3

TABLE III

| Ingredients | wt.-gms. | Temp. at Addition |
|---|---|---|
| Water | 773.2 | |
| 36 D.E. corn syrup | 200.0 | 76° F. |
| Calcium hydroxide | 3.7 | 77.5° F. |
| Magnesium hydroxide | 1.9 | 82° F. |
| Dipotassium phosphate | 11.2 | 81° F. |
| Citric acid | 10.0 | 84° F. |
| | 1000.00 gm. | |

A mineral composition was prepared using the above ingredients in a 2 liter glass beaker which was placed in an ice water bath to prevent any extreme temperature rise during the initial blending. Continuous vigorous agitation was supplied with a "TEKMAR" mixer throughout the entire preparation.

Ingredients were added to the beaker in the order listed above. The corn syrup and water were mixed until well blended, approximately ten minutes. After addition of each subsequent ingredient, the composition was agitated for five minutes prior to the next addition. After introduction of the citric acid, mixing was continued for ten minutes. The pH of the composition at this point was 6.75.

The composition was then heated in a water bath over a hot plate, while agitation was continued for approximately 35 minutes until a temperature of 180° F. was reached. The pH of the composition was 6.45.

A sample of this product was placed in a sterilized bottle. The composition was semitransparent, whitish in color and appeared homogeneous.

After overnight storage at 45° F., the composition appeared almost completely transparent and no precipitation was present.

A portion of this sample was concentrated and dried in a vacuum oven and subsequently exhibited the ability to be readily reconstituted in water.

EXAMPLE 4

A water dispersible calcium, magnesium and phosphorus mineral enrichment composition of commercial proportions was made using the ingredients set forth in Table IV below. Each ingredient was added in the order listed in Table IV to a 200 gallon jacketed stainless steel mixing vessel equipped with a double counter-rotating stirrer and a loop circulation system whereby the product was drawn from the bottom outlet of the vessel and pumped into the top surface of the product. The temperature at each addition was controlled by a water-steam mixing valve and the times (Hold Time) following the addition of each ingredient are recorded in Table IV.

Following the heating period, the composition was homogenized hot at 3000 p.s.i.-500 p.s.i., first and second stage respectively through a Gaulin homogenizer and then pumped to a Damrow spray drier and dried.

The resultant dried powder in a 10% aqueous dispersion had a pH of 6.6 and a clear viscous slightly yellow solution resulted on the addition of 150 grams of the powdered composition to 100 grams of water (60% solids).

TABLE IV

| | | MINERAL COMPOSITION - 25% SOLIDS | | | | |
|---|---|---|---|---|---|---|
| Temperature °F. | Hold Time (min.) | Ingredients | Mole Ratio | Percent | Lb. | Oz. |
| 80 | | Water | | 75.00 | 562 | 8 |
| | 2 | Corn Syrup Solids 36 D.E. | 1.16 | 8.33 | 62 | 8 |
| | 2 | Calcium Hydroxide | .78 | 2.30 | 17 | 4 |
| | 3 | Magnesium Hydroxide | .51 | 1.18 | 8 | 14 |
| | 2 | Dipotassium Phosphate | 1.00 | 6.97 | 52 | 4 |
| 80 | 5 | Citric Acid Anhydrous | .81 | 6.22 | 46 | 10 |
| | | | | 100.00 | | |

EXAMPLE 5

Non-Dairy Milk Mineral Enrichment Composition Prepared in Situ

For the purpose of demonstrating the utility of the mineral compositions, a non-dairy milk formulation was prepared. Fresh whole pasteurized milk has the following approximate mineral composition based upon the Agriculture Handbook No. 8-1, U.S. Department of Agriculture, Agricultural Research Service, Revised November 1976:

| Nutrients | Units | Amount in 100 grams |
|---|---|---|
| Calcium | mg. | 119 |
| Iron | mg. | .05 |
| Magnesium | mg. | 13 |
| Phosphorus | mg. | 93 |
| Potassium | mg. | 152 |
| Sodium | mg. | 49 |
| Zinc | mg. | .38 |

The nutrient composition of the non-dairy milk formulation was patterned after the above. Employing the formula as set down in Table V, the ingredients were combined in the order listed using a Case laboratory emulsifier. The Case unit includes a stainless steel, conical vessel having therein a series of superposed, perforated plates, with the perforations in respective plates being out of alignment with those of adjacent plates.

The unit also includes a recirculation line for taking liquid from the bottom of the vessel back to the top thereof, and a positive displacement pump is interposed in the recirculation line for relatively high pressure recirculation of liquid material. During processing, the liquid components are recirculated through the emulsification apparatus and are subjected to vigorous agitation and shear. In addition, direct steam addition is provided for further agitation and heating of the liquid product during recirculation thereof.

In the use of the Case laboratory emulsifier, the starch-derived carbohydrate material and water are first admixed and run through the Case emulsifier to ensure complete dispersion thereof. The ingredient following was then added at the temperature stated in Table V and mixed for the period stated under Hold Time prior to the addition of the next ingredient.

Finally, other optional products such as salt and flavoring agents are added, with a final hold time period to ensure complete dispersion of the solids within the water. The product was then homogenized in a conventional Gaulin two-stage homogenizer using, 3500 p.s.i. first stage, and 500 p.s.i. second stage.

TABLE V

| Temperature °F. | Hold Time (Min.) | Ingredients | % by Weight |
|---|---|---|---|
| 75 | | Water | 83.283767 |
| | | Corn syrup 24 D.E. | 11.000000 |
| | 1 | High fructose corn syrup 120 D.E. | .250000 |
| | | Calcium hydroxide | .222000 |
| | 1 | Magnesium hydroxide | .031000 |
| | | Dipotassium phosphate | .705000 |
| | 1 | Citric acid anhydrous | .380000 |
| | | Electrolytic iron | .000146 |
| | | Zinc oxide | .000455 |
| 80 | | F. D. & C. yellow color | .013000 |
| 140 | 1 | Soybean oil (P/S ratio = 3.1) | 3.500000 |
| | | Diacetyl tartaric acid esters of mono-diglycerides | .100000 |
| | | Distilled succinylated monoglycerides | .100000 |
| | | Sodium stearyl-2-lactylate | .100000 |
| | | Hexaglycerol dis-tearate | .100000 |
| 160 | 1 | Triglycerol mono-stearate | .100000 |
| | | Potassium chloride | .057000 |
| 175 | 1 | Artificial Milk flavor | .049000 |

This product was immediately cooled to 38° F., and the following nutritional fortification was intimately added thereto using a high shear mixer:

| | | | |
|---|---|---|---|
| 38 | | Vitamin A palmitate | .000956 |
| | | Ascorbic acid | .004781 |
| | | Thiamine mononitrate | .000038 |
| | | Riboflavin | .000186 |
| | | Niacinamide | .000164 |
| | | Vitamin D-2 | .000478 |
| | | Pyridoxine hydrochloride | .000064 |
| | | Vitamin $B_{12}$ (0.1%) | .000539 |
| | | Pantothenic acid | .001039 |
| 40 | 2 | Folic acid (1%) | .000387 |
| | | | 100.000000 |

The pH of this fortified synthetic milk was measured at 6.8, and freeze-thaw stability was excellent. The product exhibited all of the attributes of whole milk, i.e., general appearance, color, mouth feel, correct residual mouth feel and aftertaste. Also, no precipitation of solids from the liquid was observed.

EXAMPLE 6

The spray dried product prepared in Example 4 was tested for bioavailability of calcium and phosphorus in feeding studies utilizing weanling rats.

A standard purified diet for rats was used. The control diet contained $CaCO_3$ and $NaH_2PO_4$ as the sources of calcium and phosphorus. The test diet contained the product of Example 4 as the principal source of calcium, with $CaCO_3$ added to obtain a final calcium level of 0.60%. A third diet consisted of Purina Lab Chow.

It was noted that the control rats did not grow as well as the rats on the test diet or those on the Purina Lab Chow. The test animals did as well as those on the Purina Lab Chow which is considered to be an optimum diet for rats.

The bioavailability of the test product is reflected in the bone ash data expressed as a percent of the dry bone weight. The femur bone was utilized for the assay.

| Results: | Bone Ash/Dry Bone Weight |
|---|---|
| Control ($CaCO_3$) | 52.23% |
| Test Diet | 50.82% |
| Purina Lab Chow | 54.73% |

The data indicate that the calcium and phosphorus in the material prepared in Example 4 are readily available to the rat.

EXAMPLE 7

A large number of compositions in accordance with the invention were produced, with various reactants and reactant ratios being tested. In each of the runs, the composition was made as follows:

In each case (except as noted), a round-bottom stainless steel, jacketed kettle was employed having a mixing element therein. Respective quantities (as set forth in the following tables) of water, adjunct (where used) and cation source were first mixed for a period of about 2 minutes. At this point the phosphate source was added, with additional mixing for about 2 minutes. The organic acid (usually citric) was then added and mixing was continued for about 2 minutes thereafter. During these mixing steps, cold tap water was fed to the kettle jacket to maintain the temperature of the reaction mixture at room temperature or below.

After the initial mixing step was completed, a steam/water mixture was directed to the kettle jacket to begin heating the material therein. Mixing was continued during this step. When the temperature of the mixture reached about 200° F., a steam/water mix was employed to maintain the temperature level, and a final mixing step of about 30 minutes was conducted.

In certain instances the products were homogenized (3500 p.s.i. first stage, 500 p.s.i. second stage or alternately a single stage, 2000 p.s.i.), and thereafter spray dried to yield a powdered product which could be reconstituted in water.

The following legend (Table VII) will facilitate an understanding of Tables VIII and IX hereunder.

The starting materials for the products synthesized in this series of runs are set forth in Table VIII.

A number of the runs identified in Table VIII were analyzed for cations in solution, in order to determine the dispersibility of the resultant compounds in aqueous media. Cations in solution were determined by atomic absorption techniques using conventional procedures.

The results of this series of tests are set forth in the following Table IX. In addition, alkali metal reactant ratios are given in the table along with theoretical efficiencies (i.e., actual cations in solution divided by theoretically available cations).

In the case of formulae Nos. 40, 85 and 90, higher reaction temperatures and pressures were used. Specifically, in formula 40, the reaction was carried out at about 375° F., 170 p.s.i.; formula 85 at about 360°–375° F., 150–170 p.s.i.; and formula 89 at about 350°–370° F., 120–160 p.s.i.

TABLE VII

MINERAL COMPOSITIONS
LEGEND

| | | |
|---|---|---|
| A = Ca(OH)$_2$ | A$_1$ = Na$_2$HPO$_4$ | A$_2$ = Dextrose |
| D = Mg(OH)$_2$ | D$_1$ = ZnCO$_3$ | D$_2$ = K$_3$PO$_4$ |
| E = FeCl$_3$.6H$_2$O | E$_1$ = ZnO | E$_2$ = KCl |
| G = FeCO$_3$ saccharated | G$_1$ = LiOH.H$_2$O | G$_2$ = Phosphorus acid |
| J = FeHO$_2$ | J$_1$ = Cu(OH)$_2$ | J$_2$ = Metaphosphoric acid |
| L = Fe$_2$(SO$_4$)$_3$.H$_2$O | L$_1$ = Cu Gluconate | |
| M = FeNH$_4$.Citrate | M$_1$ = ZnCl$_2$ | L$_2$ = Nickel hydroxide |
| Q = CuCl$_2$.2H$_2$O | Q$_1$ = Zn Gluconate | |
| R = H$_3$BO$_3$ | R$_1$ = Molybdic Acid 85% | M$_2$ = Mercuric Oxide Red |
| S = ZnSO$_4$.7H$_2$O | S$_1$ = KOH | |
| T = MnSO$_4$.(4–5)H$_2$O | T$_1$ = H$_3$PO$_4$ 85% | Q$_2$ = Nitrilotriacetic acid |
| X = MoO$_3$ | X$_1$ = KH$_2$PO$_4$ | R$_2$ = Glycerin |
| Y = Mn(NO$_3$)$_2$.4H$_2$O | Y$_1$ = EDTA | S$_2$ = Sucrose |
| Z = Cu(NO$_3$)$_2$.3H$_2$O | Z$_1$ = Corn Syrup Solids 36 DE | T$_2$ = Gluconic Acid 50% |
| | | X$_2$ = Glycolic Acid |
| | | Y$_2$ = Diethylene-triamine Petaacetic Acid, Pentasodium Salt 41% |

TABLE VIII

MINERAL COMPOSITIONS

| Formula Number | pH | Percent[1] Solids | K$_2$HPO$_4$[2] | Other Phosphate Sources | Other Potassium Sources | Cation[3] Sources | | Anhydrous Citric Acid | Other Acids | Adjuncts[4] |
|---|---|---|---|---|---|---|---|---|---|---|
| 1 | 6.4 | 19.84 | 4.8 | — | — | A | 3.7 | 3.6 | — | — |
| | | | | | | D | 2.4 | | | |
| | | | | | | E | .11 | | | |
| 2 | 6.5 | 19.73 | 3.2 | — | — | A | 2.5 | 2.3 | — | Z$_1$ 33.79 |
| | | | | | | D | 1.67 | | | |
| | | | | | | E | .11 | | | |
| 3 | 6.65 | 18.652 | 3.2 | — | — | A | 2.48 | 2.4 | — | Z$_1$ 28.90 |
| | | | | | | G | .3% | | | |
| | | | | | | D | 1.62 | | | |
| 4 | 6.35 | 19.64 | 4.8 | — | — | A | 3.7 | 3.6 | — | — |
| | | | | | | D | 2.4 | | | |
| | | | | | | J | .11 | | | |
| 5 | 6.10 | 19.74 | 4.8 | — | — | A | 3.7 | 3.6 | — | — |
| | | | | | | D | 2.4 | | | |
| | | | | | | L | .05 | | | |
| 6 | 6.30 | 19.84 | 4.8 | — | — | A | 3.7 | 3.6 | — | — |
| | | | | | | D | 2.4 | | | |
| | | | | | | M | .3% | | | |
| 7 | 5.60 | 14.36 | 3.2 | — | — | A | 2.5 | 1.0 | — | — |
| | | | | | | D | 1.67 | | | |
| | | | | | | E | 1.5 | | | |
| 8 | 5.70 | 23.04 | 4.8 | — | — | A | 3.7 | 3.4 | — | — |
| | | | | | | D | 2.4 | | | |
| | | | | | | L | 1.0 | | | |
| 9 | 4.90 | 14.16 | 4.5 | — | — | J | 2.25 | 2.25 | — | — |
| 10 | 7.05 | 27.16 | 10.28 | — | — | D | 5.14 | 3.25 | — | — |
| 11 | 6.70 | 19.54 | 4.8 | — | — | A | 3.7 | 3.49 | — | — |
| | | | | | | D | 2.4 | | | |
| | | | | | | Q | .18 | | | |
| 12 | 6.95 | 19.54 | 4.8 | — | — | A | 3.7 | 3.44 | — | — |
| | | | | | | D | 2.4 | | | |
| | | | | | | R | .65 | | | |
| 13 | 7.40 | 19.34 | 4.8 | — | — | A | 3.7 | 3.40 | — | — |
| | | | | | | D | 2.4 | | | |
| | | | | | | S | .1 | | | |
| 14 | 7.30 | 19.34 | 4.8 | — | — | A | 3.7 | 3.40 | — | — |
| | | | | | | D | 2.4 | | | |
| | | | | | | T | .18 | | | |
| 15 | 6.95 | 19.34 | 4.8 | — | — | A | 3.7 | 3.40 | — | — |
| | | | | | | D | 2.4 | | | |
| | | | | | | X | .21 | | | |

TABLE VIII-continued
MINERAL COMPOSITIONS

| Formula Number | pH | Percent[1] Solids | $K_2HPO_4$[2] | Other Phosphate Sources | | Other Potassium Sources | | Cation[3] Sources | | Anhydrous Citric Acid | Other Acids | | Adjuncts[4] | |
|---|---|---|---|---|---|---|---|---|---|---|---|---|---|---|
| 16 | 6.80 | 20.04 | 4.8 | — | | — | | A | 3.7 | 3.40 | — | | — | |
| | | | | | | | | D | 2.4 | | | | | |
| | | | | | | | | Y | .28 | | | | | |
| 17 | 5.50 | 22.76 | 4.8 | — | | — | | A | 2.5 | 3.40 | — | | — | |
| | | | | | | | | D | 4.1 | | | | | |
| | | | | | | | | L | .9 | | | | | |
| 18 | 4.20 | 16.11 | — | $T_1$ | 2.0 | $S_1$ | 8.0 | A | 2.0 | 2.00 | — | | — | |
| | | | | | | | | L | 1.0 | | | | | |
| 19 | 4.40 | 19.31 | — | $T_1$ | 2.0 | $S_1$ | 8.0 | A | 2.0 | 2.00 | — | | $Z_1$ | 16.57 |
| | | | | | | | | S | 1.0 | | | | | |
| 20 | 6.20 | 24.84 | 4.8 | — | | — | | A | 3.7 | 3.60 | — | | $Z_1$ | 20.00 |
| | | | | | | | | D | 2.4 | | | | | |
| | | | | | | | | E | .11 | | | | | |
| 21 | 7.55 | 22.53 | 4.8 | — | | — | | A | 3.7 | 3.10 | — | | $Z_1$ | 17.26 |
| | | | | | | | | D | 2.4 | | | | | |
| | | | | | | | | J | .11 | | | | | |
| 22 | 7.60 | 22.49 | 4.8 | — | | — | | A | 3.7 | 3.10 | — | | $Z_1$ | 16.68 |
| | | | | | | | | D | 2.4 | | | | | |
| | | | | | | | | L | .05 | | | | | |
| 23 | 6.90 | 23.21 | 4.8 | — | | — | | A | 3.7 | 3.40 | — | | $Z_1$ | 16.68 |
| | | | | | | | | D | 2.4 | | | | | |
| | | | | | | | | Q | .18 | | | | | |
| 24 | 6.95 | 22.85 | 4.8 | — | | — | | A | 3.7 | 3.20 | — | | $Z_1$ | 16.67 |
| | | | | | | | | D | 2.4 | | | | | |
| | | | | | | | | S | .1 | | | | | |
| 25 | 6.90 | 22.97 | 4.8 | — | | — | | A | 3.7 | 3.30 | — | | $Z_1$ | 16.68 |
| | | | | | | | | D | 2.4 | | | | | |
| | | | | | | | | T | .18 | | | | | |
| 26 | 7.0 | 22.97 | 4.8 | — | | — | | A | 3.7 | 3.30 | — | | $Z_1$ | 16.68 |
| | | | | | | | | D | 2.4 | | | | | |
| | | | | | | | | X | .21 | | | | | |
| 27 | 6.0 | 10.72 | 2.6 | — | | — | | A | 2.0 | — | dl-Malic | 2.98 | — | |
| | | | | | | | | D | 1.3 | | | | | |
| 28 | 6.2 | 11.08 | 2.6 | — | | — | | A | 2.0 | — | Adipic | 3.00 | — | |
| | | | | | | | | D | 1.3 | | | | | |
| 29 | 6.1 | 12.45 | 2.6 | — | | — | | A | 2.0 | — | Hydro-chloric | 5.00 | — | |
| | | | | | | | | D | 1.3 | | | | | |
| 30 | 5.85 | 13.04 | 2.6 | — | | — | | A | 2.0 | — | Lactic | 5.97 | — | |
| | | | | | | | | D | 1.3 | | | | | |
| 31 | 6.35 | 20.00 | 4.8 | — | | — | | A | 3.7 | 3.75 | — | | — | |
| | | | | | | | | D | 2.4 | | | | | |
| 32 | 6.30 | 29.31 | 4.8 | — | | — | | A | 3.7 | 3.60 | — | | $Z_1$ | 33.33 |
| | | | | | | | | D | 2.4 | | | | | |
| 33 | 8.60 | 19.62 | 4.8 | — | | — | | A | 3.7 | — | Oxalic .2$H_2O$ | 5.60 | — | |
| | | | | | | | | D | 2.4 | | | | | |
| 34 | 5.70 | 19.06 | 4.8 | — | | — | | A | 3.7 | — | Fumaric | 5.60 | — | |
| | | | | | | | | D | 2.4 | | | | | |
| 35 | 6.85 | 29.40 | 10.28 | — | | — | | A | 5.14 | 3.97 | — | | — | |
| 36 | 6.50 | 17.19 | 4.0 | — | | $S_1$ | 3.3 | Z | 2.0 | 2.00 | — | | — | |
| 37 | 6.10 | 19.50 | 7.2 | — | | — | | A | 3.0 | 1.98 | — | | — | |
| | | | | | | | | $L_1$ | .3 | | | | | |
| | | | | | | | | $M_1$ | .3 | | | | | |
| 38 | 6.80 | 18.93 | 6.6 | — | | — | | D | 3.0 | 1.90 | Molybdic | 0.5% | — | |
| | | | | | | | | $Q_1$ | .3 | | | | | |
| 39 | 7.10 | 14.27 | 5.0 | — | | — | | A | 2.5 | 1.93 | — | | — | |
| 40 | 4.50 | 15.42 | — | $T_1$ | 1.0 | $S_1$ | 1.0 | A | 2.5 | 1.00 | — | | — | |
| 41 | 6.60 | 14.43 | 4.0 | — | | — | | A | 1.0 | 2.00 | — | | — | |
| | | | | | | | | S | 1.0 | | | | | |
| 42 | 6.3 | 10.00 | — | $T_1$ | 1.0 | $S_1$ | 2.0 | A | 2.5 | .64 | — | | — | |
| 43 | 6.5 | 14.86 | 4.0 | — | | — | | D | 4.0 | 2.0 | — | | — | |
| | | | | | | | | X | 2.0 | | | | | |
| 44 | 12.5 | 12.69 | 1.0 | — | | — | | A | 7.0 | 3.0 | — | | — | |
| 45 | 10.5 | 10.85 | 3.0 | — | | — | | A | 5.0 | 1.0 | — | | — | |
| 46 | 4.5 | 5.15 | — | $T_1$ | 2.0 | — | | A | 5.0 | — | $Y_1$ | 1.0 | — | |
| 47 | 5.0 | 5.38 | — | $T_1$ | 4.0 | — | | A | 8.0 | — | $Y_1$ | 1.0 | — | |
| 48 | 3.7 | 4.70 | — | $T_1$ | 2.0 | — | | A | 4.0 | — | $Y_1$ | 1.0 | — | |
| 49 | 8.15 | 9.31 | — | $T_1$ | 3.0 | — | | A | 6.0 | 1.0 | — | | — | |
| 50 | 6.10 | 5.12 | — | $T_1$ | 1.0 | — | | A | 3.0 | 1.0 | — | | — | |
| 51 | 5.30 | 5.05 | — | $T_1$ | 4.0 | — | | A | 9.0 | 2.0 | — | | — | |
| 52 | 5.16 | 4.99 | — | $T_1$ | 1.4 | — | | A | 6.3 | 2.8 | — | | — | |
| 53 | 5.25 | 9.98 | — | $T_1$ | 1.4 | — | | A | 5.6 | 1.4 | Oxalic | 1.4 | — | |
| 54 | 5.70 | 9.13 | — | $T_1$ | 1.0 | — | | A | 5.0 | 1.0 | Oxalic | 2.0 | — | |
| 55 | 8.30 | 11.06 | — | $T_1$ | 2.4 | — | | A | 6.6 | 1.2 | Oxalic | 1.2 | — | |
| 56 | 7.50 | 20.94 | — | $T_1$ | 3.0 | — | | A | 6.0 | 1.0 | — | | $Z_1$ | 50.0 |
| 57 | 6.10 | 10.25 | — | $T_1$ | 1.0 | — | | A | 3.0 | 1.0 | — | | $Z_1$ | 50.0 |
| 58 | 6.65 | 16.58 | — | $T_1$ | 4.0 | — | | A | 9.0 | 2.0 | — | | $Z_1$ | 50.0 |
| 59 | 5.60 | 22.84 | — | $T_1$ | 1.4 | — | | A | 6.3 | 2.8 | — | | $Z_1$ | 50.0 |
| 60 | 6.60 | 10.07 | — | $T_1$ | 2.0 | $S_1$ | 1.0 | A | 5.0 | 2.0 | — | | — | |

TABLE VIII-continued
MINERAL COMPOSITIONS

| Formula Number | pH | Percent[1] Solids | $K_2HPO_4$[2] | Other Phosphate Sources | | Other Potassium Sources | | Cation[3] Sources | | Anhydrous Citric Acid | Other Acids | | Adjuncts[4] | |
|---|---|---|---|---|---|---|---|---|---|---|---|---|---|---|
| 61 | 7.70 | 11.01 | — | $T_1$ | 2.0 | $S_1$ | 4.0 | A | 4.0 | 2.0 | — | | — | |
| 62 | 7.10 | 11.26 | — | $T_1$ | 1.5 | $S_1$ | 3.0 | A | 4.5 | 1.5 | Oxalic | 1.5 | — | |
| 63 | 6.80 | 20.14 | — | $T_1$ | 2.0 | $S_1$ | 1.0 | A | 5.0 | 2.0 | — | | $Z_1$ | 50.0 |
| 64 | 8.25 | 8.17 | — | $T_1$ | 2.0 | $S_1$ | 5.0 | A | 2.0 | 1.0 | — | | — | |
| 65 | 7.50 | 7.79 | — | $T_1$ | 2.0 | $S_1$ | 3.0 | A | 3.0 | 1.0 | — | | — | |
| 66 | 7.30 | 7.41 | — | $T_1$ | 2.0 | $S_1$ | 1.0 | A | 4.0 | 1.0 | — | | — | |
| 67 | 6.90 | 22.02 | — | $T_1$ | 2.0 | $S_1$ | 4.0 | A | 4.0 | 2.0 | — | | $Z_1$ | 50.0 |
| 68 | 9.90 | 16.34 | — | $T_1$ | 2.0 | $S_1$ | 5.0 | A | 2.0 | 1.0 | — | | $Z_1$ | 50.0 |
| 69 | 7.30 | 15.57 | — | $T_1$ | 2.0 | $S_1$ | 3.0 | A | 3.0 | 1.0 | — | | $Z_1$ | 50.0 |
| 70 | 7.30 | 14.81 | — | $T_1$ | 2.0 | $S_1$ | 1.0 | A | 4.0 | 1.0 | — | | $Z_1$ | 50.0 |
| 71 | 6.90 | 22.02 | — | $T_1$ | 2.0 | $S_1$ | 4.0 | A | 4.0 | 2.0 | — | | — | |
| 72 | 6.80 | 6.39 | — | $T_1$ | 2.0 | $S_1$ | 2.0 | A | 4.0 | — | $Y_1$ | 1.0 | — | |
| 73 | 10.50 | 4.73 | — | $T_1$ | 2.0 | $S_1$ | 2.0 | A | 2.0 | — | — | | — | |
| 74 | 7.00 | 6.61 | — | — | | $S_1$ | 2.0 | A | 2.0 | 2.0 | — | | — | |
| 75 | 6.10 | 5.67 | — | $T_1$ | 1.0 | $S_1$ | 2.0 | A | 2.0 | 1.0 | — | | — | |
| 76 | 10.10 | 5.15 | 1.0 | — | | — | | A | 2.0 | 1.0 | — | | — | |
| 77 | 8.90 | 6.95 | 1.0 | — | | — | | A | 2.0 | 1.0 | — | | $A_2$ | 1.0 |
| 78 | 5.20 | 4.76 | — | $X_1$ | 1.0 | — | | A | 2.0 | 1.0 | — | | — | |
| 79 | 4.85 | 6.57 | — | $X_1$ | 1.0 | — | | A | 2.0 | 1.0 | — | | $A_2$ | 1.0 |
| 80 | 5.4 | 20.21 | 4.6 | — | | — | | A | 4.7 | 4.6 | — | | — | |
| 81 | 5.0 | 15.16 | 3.4 | — | | — | | A | 3.5 | 3.4 | — | | — | |
| 82 | 5.9 | 10.00 | 6.5 | — | | — | | A | 3.3 | 3.3 | — | | — | |
| 83 | 13.1 | 12.5 | — | — | | $D_2$ | 2.6 | A | 2.6 | 1.3 | — | | — | |
| 84 | 5.8 | 12.5 | — | — | | $D_2$ | 2.6 | A | 2.6 | 2.6 | — | | — | |
| 85 | 8.6 | 13.8 | — | — | | $D_2$ | 4.0 | A | 2.0 | 2.0 | — | | — | |
| 86 | 4.15 | 9.77 | — | $T_1$ | 1.0 | $E_2$ | 6.0 | A | 3.0 | 1.0 | — | | — | |
| 87 | 6.9 | 12.11 | — | $T_1$ | 2.0 | $S_1$ | 8.0 | A | 2.0 | 2.0 | — | | — | |
| 88 | 6.1 | 20.00 | 4.8 | — | | — | | A D | 3.7 2.4 | 3.9 | — | | — | |
| 89 | 7.0 | 24.77 | 3.2 | — | | — | | A D E | 2.5 1.6 0.11 | 2.3 | — | | $Z_1$ | 39.22 |
| 90 | 11.0 | 5.15 | 1.0 | — | | — | | A | 2.0 | 1.0 | — | | — | |
| 91 | 11.0 | 5.15 | 1.0 | — | | — | | A | 2.0 | 1.0 | — | | — | |
| 92 | 11.0 | 5.15 | 1.0 | — | | — | | A | 2.0 | 1.0 | — | | — | |
| 93 | 11.0 | 5.15 | 1.0 | — | | — | | A | 2.0 | 1.0 | — | | — | |
| 94 | 9.4 | 4.91 | — | $A_1$ | 1.0 | — | | A | 2.0 | 1.0 | — | | — | |
| 95 | 10.0 | 5.25 | 1.0 | — | | — | | A | 2.0 | — | $Q_2$ | 1.0 | — | |
| 96 | 6.7 | 6.22 | 1.0 | — | | — | | $D_1$ | 2.0 | 1.0 | — | | — | |
| 97 | 6.4 | 5.34 | 1.0 | — | | — | | $E_1$ | 2.0 | 1.0 | — | | — | |
| 98 | 2.8 | 7.09 | 1.0 | — | | — | | T | 2.0 | 1.0 | — | | — | |
| 99 | 9.05 | 6.19 | 1.0 | — | | — | | A | 2.0 | 1.0 | — | | $R_2$ | 1.0 |
| 100 | 8.7 | 5.15 | 1.0 | — | | — | | A | 2.0 | 1.0 | — | | — | |
| 101 | 8.3 | 5.15 | 1.0 | — | | — | | A | 2.0 | 1.0 | — | | — | |
| 102 | 8.15 | 7.97 | 1.0 | — | | — | | A | 2.0 | 1.0 | — | | $S_2$ | 1.0 |
| 103 | 8.4 | 4.14 | — | — | | — | | $G_1$ A | 2.0 2.0 | 1.0 | $T_1$ | 1.0 | — | |
| 104 | 10.35 | 8.58 | — | — | | — | | A | 2.0 | — | $T_1$ $Y_2$ | 1.0 1.0 | $A_2$ | 1.0 |
| 105 | 9.6 | 6.07 | — | — | | $S_1$ | 1.0 | A | 2.0 | — | $T_1$ $T_2$ | 1.0 2.0 | $A_2$ | 1.0 |
| 106 | 8.3 | 5.45 | — | $X_1$ | 1.0 | — | | A | 2.0 | — | $X_2$ | 2.0 | $A_2$ | 1.0 |
| 107 | 1.65 | 3.83 | — | — | | — | | J | 2.0 | 1.0 | $T_1$ | 1.0 | $A_2$ | 1.0 |
| 108 | 2.1 | 10.33 | 1.0 | — | | — | | S | 2.0 | 1.0 | — | | $R_2$ | 1.0 |
| 109 | 4.35 | 6.70 | 1.0 | — | | — | | $J_1$ | 2.0 | 1.0 | — | | $A_2$ | 1.0 |
| 110 | 2.8 | 4.88 | 0.5 | — | | — | | Y | 1.0 | 0.5 | — | | $A_2$ | 0.5 |
| 111 | 7.9 | 6.59 | — | $G_2$ | 1.0 | $S_1$ | 1.0 | A | 2.0 | 1.0 | — | | $A_2$ | 1.0 |
| 112 | 8.4 | 6.75 | — | $J_2$ | 1.0 | $S_1$ | 1.0 | A | 2.0 | 1.0 | — | | $A_2$ | 1.0 |
| 113 | 5.75 | 7.32 | 1.0 | — | | — | | $L_2$ | 2.0 | 1.0 | — | | $A_2$ | 1.0 |
| 114 | 3.95 | 4.90 | 0.5 | — | | — | | $M_2$ | 1.0 | 0.5 | — | | $A_2$ | 0.5 |

[1] Data given in percent by weight of total composition; % by weight water = 100% − percent solids
[2] All other component data, save for corn syrup, given in moles
[3] Letter designation refers to code given in Table VII; numerical data refers to moles of particular compound used
[4] Adjuncts designation refers to code given in Table VII

TABLE IX

| Formula No. | $PO_4$/Acid Ratios | Alkali Metal/ $PO_4$ Ratios | Non-alkali Metal Cation/$PO_4$ Ratios | Non-Alkali Metal Cation/Acid Ratios | Percent of Theoretical Cations in Solution | | | |
|---|---|---|---|---|---|---|---|---|
| | | | | | % Ca | % Mg | % Fe | % Others |
| 1 | 1.33:1 | 2:1 | 1.29:1 | 1.72:1 | 75.9 | 97.6 | 83.9 | — |
| 2 | 1.39:1 | 2:1 | 1.33:1 | 1.86:1 | 87.3 | 95.0 | 94.0 | — |
| 3 | 1.33:1 | 2:1 | 1.32:1 | 1.76:1 | 84.4 | — | 123.7 | — |
| 4 | 1.33:1 | 2:1 | 1.29:1 | 1.73:1 | 103.9 | — | 31.3 | — |
| 5 | 1.33:1 | 2:1 | 1.28:1 | 1.71:1 | 101.9 | 100.0 | 89.3 | — |
| 6[1,2,7] | 1.33:1 | 2:1 | 1.28:1 | 1.71:1 | Not assayed | | | |

TABLE IX-continued

| Formula No. | PO4/Acid Ratios | Alkali Metal/ PO4 Ratios | Non-alkali Metal Cation/PO4 Ratios | Non-Alkali Metal Cation/Acid Ratios | Percent of Theoretical Cations in Solution | | | |
|---|---|---|---|---|---|---|---|---|
| | | | | | % Ca | % Mg | % Fe | % Others |
| 7[1] | 3.20:1 | 2:1 | 1.77:1 | 5.67:1 | — | — | 1.6 | — |
| 8 | 1.41:1 | 2:1 | 1.48:1 | 2.1:1 | — | — | 33.0 | — |
| 9[1] | 2.00:1 | 2:1 | .5:1 | 1:1 | — | — | 14.9 | — |
| 10 | 3.16:1 | 2:1 | .5:1 | 1.58:1 | — | 65.1 | — | — |
| 11 | 1.38:1 | 2:1 | 1.31:1 | 1.80:1 | — | — | — | 105.3 Cu |
| 12 | 1.40:1 | 2:1 | 1.41:1 | 1.96:1 | 36.6 | — | — | 88.9 B |
| 13[2] | 1.41:1 | 2:1 | 1.29:1 | 1.82:1 | — | — | — | 5.0 Zn |
| 14[2] | 1.41:1 | 2:1 | 1.31:1 | 1.85:1 | — | — | — | 10.0 Mn |
| 15 | 1.41:1 | 2:1 | 1.31:1 | 1.86:1 | — | — | — | 46.6 Mo |
| 16[2] | 1.41:1 | 2:1 | 1.33:1 | 1.88:1 | — | — | — | 7.8 Mn |
| 17 | 1.41:1 | 2:1 | 1.56:1 | 2.21:1 | 63.8 | 79.7 | 24.6 | — |
| 18 | 1.15:1 | 4:1 | 1.05:1 | 1:1 | 84.3 | — | 80.8 | — |
| 19 | 1.15:1 | 4:1 | 1.05:1 | 1.05:1 | 106.0 | — | 74.4 | — |
| 20 | 1.33:1 | 2:1 | 1.29:1 | 1.73:1 | 101.5 | — | 108.0 | — |
| 21[1,2,7] | 1.55:1 | 2:1 | 1.29:1 | 2.0:1 | Not assayed | | | |
| 22[1,2,7] | 1.55:1 | 2:1 | 1.28:1 | 1.98:1 | Not assayed | | | |
| 23 | 1.41:1 | 2:1 | 1.31:1 | 1.85:1 | — | — | — | 103.5 Cu |
| 24 | 1.50:1 | 2:1 | 1.29:1 | 1.94:1 | — | — | — | 47.0 Zn |
| 25 | 1.45:1 | 2:1 | 1.31:1 | 1.90:1 | — | — | — | 39.8 Mn |
| 26 | 1.45:1 | 2:1 | 1.31:2 | 1.91:1 | — | — | — | 44.8 Mo |
| 27[3] | 0.872:1 | 2:1 | 1.27:1 | 1.11:1 | 4.7 | — | — | — |
| 27A[3] | 0.872:1 | 2:1 | 1.27:1 | 1.11:1 | 4.7 | — | — | — |
| 28[3] | 0.87:1 | 2:1 | 1.27:1 | 1.1:1 | 10.8 | — | — | — |
| 29[3] | 0.52:1 | 2:1 | 1.27:1 | .55:1 | 0.8 | — | — | — |
| 30[3,7] | 0.436:1 | 2:1 | 1.27:1 | .55:1 | Not assayed | | | |
| 31 | 1.28:1 | 2:1 | 1.27:1 | 1.63:1 | 103.2 | 100.0 | — | — |
| 31A | 1.28:1 | 2:1 | 1.27:1 | 1.63:1 | 100.5 | 100.0 | — | — |
| 32 | 1.33:1 | 2:1 | 1.27:1 | 1.69:1 | 106.1 | 104.0 | — | — |
| 33[3] | 0.857:1 | 2:1 | 1.27:1 | 1.09:1 | 9.2 | — | — | — |
| 34[3] | 0.857:1 | 2:1 | 1.27:1 | 1.09:1 | 8.3 | — | — | — |
| 35 | 2.59:1 | 2:1 | 0.5:1 | 1.29:1 | 29.9 | — | — | — |
| 36 | 2.00:1 | 3:1 | 0.5:1 | 1:1 | — | — | — | 100.8 Cu |
| 37 | 3.64:1 | 2:1 | 0.5:1 | 1.82:1 | 58.4 | — | — | 187.8 Cu |
| | | | | | | | | 28.7 Zn |
| 38 | 3.47:1 | 2:1 | 0.5:1 | 1.74:1 | — | 49.4 | — | 7.6 Zn |
| | | | | | | | | 106.0 Mo |
| 39[2] | 2.59:1 | 2:1 | 0.5:1 | 1.30:1 | 15.7 | — | — | — |
| 40[2] | 1.00:1 | 1:1 | 2.5:1 | 2.5:1 | 18.6 | — | — | — |
| 41 | 2.00:1 | 2:1 | .5:1 | 23.81:1 | 37.5 | — | — | 3.3 Zn |
| 42[1] | 1.56:1 | 2:1 | 2.5:1 | 3.91:1 | 8.8 | — | — | — |
| 43 | 2.00:1 | 2:1 | 1.5:1 | 3:1 | — | 122.0 | — | 92.1 Mo |
| 44[1] | 0.33:1 | 2:1 | 7:1 | 2.33:1 | 21.7 | — | — | — |
| 45 | 3.00:1 | 2:1 | 1.67:1 | 5:1 | 86.6 | — | — | — |
| 46 | 2.00:1 | 2:1 | 2.5:1 | 5:1 | 44.6 | — | — | — |
| 47 | 4.00:1 | 2:1 | 2:1 | 8:1 | 24.0 | — | — | — |
| 48 | 2.00:1 | 2:1 | 2:1 | 4:1 | 68.5 | — | — | — |
| 49[1,4] | 3.00:1 | 2:1 | 2:1 | 6:1 | 8.1 | — | — | — |
| 50[1,4] | 1.00:1 | 2:1 | 2:1 | 6:1 | 9.4 | — | — | — |
| 51[2,4] | 2.00:1 | 2:1 | 2.25:1 | 4.5:1 | 8.8 | — | — | — |
| 52[2,4] | 0.50:1 | 2:1 | 4.5:1 | 2.25:1 | 9.9 | — | — | — |
| 53[3,4] | 0.50:1 | 2:1 | 4:1 | 2:1 | 9.3 | — | — | — |
| 54[3] | 0.33:1 | 2:1 | 5:1 | 1.67:1 | 9.6 | — | — | — |
| 55[3] | 1.00:1 | 2:1 | 2.75:1 | 2.75:1 | 1.0 | — | — | — |
| 56[1,4] | 3.00:1 | 2:1 | 2:1 | 6:1 | 0.4 | — | — | — |
| 57[1,4] | 1.00:1 | 2:1 | 3:1 | 3:1 | 16.5 | — | — | — |
| 58[1,4,7] | 2.00:1 | 2:1 | 2.25:1 | 4.5:1 | Not assayed | | | |
| 59[1,4] | 0.50:1 | 2:1 | 4.5:1 | 2.25:1 | 18.9 | — | — | — |
| 60[2] | 1.00:1 | 0.5:1 | 2.5:1 | 2.5:1 | 29.5 | — | — | — |
| 61 | 1.00:1 | 2:1 | 2:1 | 2:1 | 98.9 | — | — | — |
| 62 | 0.50:1 | 2:1 | 3:1 | 1.5:1 | 42.3 | — | — | — |
| 63 | 1.00:1 | 0.5:1 | 2.5:1 | 2.5:1 | 73.4 | — | — | — |
| 64[2] | 2.00:1 | 2.5:1 | 1:1 | 2:1 | 2.8 | — | — | — |
| 65 | 2.00:1 | 1.5:1 | 1.5:1 | 3:1 | 34.3 | — | — | — |
| 66[2] | 2.00:1 | 0.5:1 | 2:1 | 4:1 | 22.2 | — | — | — |
| Corrected for H2O | | | | | | | | |
| 66A[1] | 2.00:1 | 0.5:1 | 2:1 | 2:1 | .9 | — | — | — |
| 67 | 1.00:1 | 2:1 | 2:1 | 2:1 | 105.4 | — | — | — |
| 68[1,2,5] | 2.00:1 | 2.5:1 | 1:1 | 2:1 | 1.6 | — | — | — |
| 68A[1,2,5] | 2.00:1 | 2.5:1 | 1:1 | 2:1 | 1.6 | — | — | — |
| 69 | 2.00:1 | 1.5:1 | 1.5:1 | 3:1 | 53.1 | — | — | — |
| 70[1,5] | 2.00:1 | 0.5:1 | 2:1 | 4:1 | 28.1 | — | — | — |
| 71 | 1.00:1 | 2:1 | 2:1 | 2:1 | 117.5 | — | — | — |
| 72[1,2] | 2.00:1 | 1:1 | 2:1 | 4:1 | 22.2 | — | — | — |
| 73[1,6,7] | 0 | 1:1 | 11:1 | 0 | Not assayed | | | |
| 74[1,6,7] | 0 | 0 | 0 | 1:1 | Not assayed | | | |
| 75 | 1.00:1 | 2:1 | 2:1 | 2:1 | 29.67 | — | — | — |
| 76 | 1.00:1 | 2:1 | 2:1 | 2:1 | 87.6 | — | — | — |
| 77 | 1.00:1 | 2:1 | 2:1 | 2:1 | 114.2 | — | — | — |

TABLE IX-continued

| Formula No. | PO4/Acid Ratios | Alkali Metal/ PO4 Ratios | Non-alkali Metal Cation/PO4 Ratios | Non-Alkali Metal Cation/Acid Ratios | % Ca | % Mg | % Fe | % Others |
|---|---|---|---|---|---|---|---|---|
| 78 | 1.00:1 | 1:1 | 2:1 | 2:1 | 39.4 | — | — | — |
| 79 | 1.00:1 | 1:1 | 2:1 | 2:1 | 78.6 | — | — | — |
| 80 | 1.00:1 | 2:1 | 1:1 | 1:1 | 138.5 | — | — | — |
| 81 | 1.00:1 | 2:1 | 1:1 | 1:1 | 128.8 | — | — | — |
| 82 | 2.00:1 | 2:1 | .508:1 | 1:1 | 120.8 | — | — | — |
| 83 | 2.00:1 | 3:1 | 1:1 | 1:1 | 103.8 | — | — | — |
| 84 | 1.00:1 | 3:1 | 1:1 | 1:1 | 102.6 | — | — | — |
| 85 | 2.00:1 | 3:1 | .5:1 | 1:1 | 82.6 | — | — | — |
| 86 | 1.00:1 | 6:1 | 3:1 | 3:1 | 72.6 | — | — | — |
| 87 | 1.00:1 | 4:1 | 1:1 | 1:1 | 52.9 | — | — | — |
| 88 | 1.23:1 | 2:1 | 1.27:1 | 1.56:1 | 138.2 | — | — | — |
| 89 | 1.39:1 | 2:1 | 1.32:1 | 1.83:1 | 103.6 | 105.0 | 118.8 | — |
| 90 | 1.00:1 | 2:1 | 2:1 | 2:1 | 95.5 | — | — | — |
| 91 | 1.00:1 | 2:1 | 2:1 | 2:1 | 84.1 | — | — | — |
| 92 | 1.00:1 | 2:1 | 2:1 | 2:1 | 142.9 | — | — | — |
| 93 | 1.00:1 | 2:1 | 2:1 | 2:1 | 195.7 | — | — | — |
| 94 | 1.00:1 | 2:1 | 2:1 | 2:1 | 109.4 | — | — | 155.3 Na |
| 95 | 1.00:1 | 2:1 | 2:1 | 2:1 | 76.6 | — | — | — |
| 96 | 1.00:1 | 2:1 | 2:1 | 2:1 | — | — | — | 50.0 Zn |
| 97 | 1.00:1 | 2:1 | 2:1 | 2:1 | — | — | — | 40.0 Zn |
| 98 | 1.00:1 | 2:1 | 2:1 | 2:1 | — | — | — | 88.8 Mn |
| 99 | 1.00:1 | 2:1 | 2:1 | 2:1 | 140.3 | — | — | — |
| 100 | 1.00:1 | 2:1 | 2:1 | 2:1 | 101.8 | — | — | — |
| 101 | 1.00:1 | 2:1 | 2:1 | 2:1 | 129.5 | — | — | — |
| 102 | 1.00:1 | 2:1 | 2:1 | 2:1 | 111.2 | — | — | — |
| 103 | 1.00:1 | 2:1 | 2:1 | 2:1 | 110.3 | — | — | — |
| 104 | 1.00:1 | 5:1 | 2:1 | 2:1 | 48.9 | — | — | — |
| 105[3] | 0.50:1 | 1:1 | 2:1 | 1:1 | 1.1 | — | — | — |
| 106[3] | 0.50:1 | 1:1 | 2:1 | 1:1 | 16.1 | — | — | — |
| 107 | 1.00:1 | 0 | 2:1 | 2:1 | — | — | 12.5 | — |
| 108 | 1.00:1 | 2:1 | 2:1 | 2:1 | — | — | — | 113.8 Zn |
| 109 | 1.00:1 | 2:1 | 2:1 | 2:1 | — | — | — | 60.8 Cu |
| 110 | 1.00:1 | 2:1 | 2:1 | 2:1 | — | — | — | 134.0 Mn |
| 111 | 1.00:1 | 1:1 | 2:1 | 2:1 | 15.16 | — | — | — |
| 112 | 1.00:1 | 1:1 | 2:1 | 2:1 | 23.00 | — | — | — |
| 113 | 1.00:1 | 2:1 | 2:1 | 2:1 | — | — | — | 41.33 Ni |
| 114 | 1.00:1 | 2:1 | 2:1 | 2:1 | — | — | — | 5.91 Hg |

As noted above, compositions in accordance with the invention should preferably exhibit an aqueous dispersibility such that at least about 30% by weight of the theoretically available, nonalkali metal cations present are dispersed in water at ambient temperature. A perusal of the data given in Table IX will demonstrate that certain of the formulae (noted with superscripts) do not meet this preferred minimum dispersibility. For sake of completeness and to elucidate the most preferred compositions and starting reagents, the following is pertinent. All formulae marked with a superscript "1" indicate a situation where one or more of the reactant ratios (i.e., PO4/acid, alkali-metal cation/PO4, or non-alkali metal cation/PO4) are less than optimum; formulae marked with a superscript "2" indicate cases where stoichiometric balance between the reactants was not maintained; formulae designated with a superscript "3" indicate use of an improper acid, e.g., a mono- or dicarboxylic acid; superscript "4" denotes cases where no alkali metal ions are present; superscript "5" refers to addition of corn syrup after the reaction is complete, as opposed to initial addition; superscript "6" indicates situations where no acid was added.

However, a review of the overall test results unequivocably illustrates the wide variety of compounds produceable by the methods of the instant invention. In most cases (even those under 30% theoretical efficiency), the dispersibility results exceed, by orders of magnitude, that of typical mineral-containing compounds.

EXAMPLE 8

Non-Dairy Milk Containing Spray Dried Mineral Enrichment Composition

A mineral nutrient composition patterned after the calcium, magnesium and phosphorus composition of whole milk was prepared and spray dried using the following formulation table and the procedure described in Example 7.

TABLE X

| Ingredients | Moles | Wt.-Gms | Temp. °F. | Hold Time (Mins.) |
|---|---|---|---|---|
| Water | | 13,535 | 80 | |
| Corn Syrup 36 D.E. | | 270 | | |
| Sugar | | 250 | | 5 |
| Calcium Hydroxide | 3.14 | 233 | | 3 |
| Magnesium Hydroxide | .57 | 33 | | 3 |
| Dipotassium Phosphate | 1.85 | 323 | | 3 |
| Citric Acid | 1.85 | 356 | 80 | |

The above product was employed in the preparation of a non-dairy milk following the formula and procedure as described below in Table XI.

TABLE XI

| Temp. °F. | Hold Time (Mins.) | Ingredients | % By Weight |
|---|---|---|---|
| 75 | 1 | Water | 83.771399 |
| | | Corn Syrup 36 D.E. | 10.730000 |

TABLE XI-continued

| Temp. °F. | Hold Time (Mins.) | Ingredients | % By Weight |
|---|---|---|---|
| | | Mineral Composition | 1.465000 |
| | | Electrolytic Iron | .000146 |
| | | Zinc Oxide | .000455 |
| 80 | | F.D. & C. Yellow Color | .013000 |
| 140 | 1 | Corn Oil (P/S ratio 4.2) | 3.500000 |
| | | Diacetyl Tartaric Acid Esters of Monoglycerides | .150000 |
| | | Distilled Succinylated Monoglycerides | .120000 |
| 160 | 1 | Hexaglycerol Distearate | .150000 |
| | | Glyceryl Monostearate (52% Alpha) | .060000 |
| | | Potassium Chloride | .037000 |
| 175 | 1 | Milk Flavor | .003000 |

Ten thousand grams of the above were prepared, frozen and submitted to an independent laboratory for mineral analysis. The following results were obtained.

TABLE XII

| Mineral | Mg./100 gm. |
|---|---|
| Calcium | 131.7 |
| Magnesium | 13.5 |
| Potassium | 314.0 |
| Sodium | 50.33 |

The above described results confirm the effectiveness of the mineral enrichment composition to function as a fortification agent in food analogs or any beverage or system wherein it is desirous to incorporate beneficial mineral elements.

In another series of runs, a large number of compositions in accordance with the invention were produced, with various reactants and reactant ratios being tested. In the runs (Examples Nos. 9–45), the compositions were made as follows:

In each case (except as noted), a roundbottom stainless steel, jacketed kettle was employed having a mixing element therein. Respective quantities (as set forth in the following examples) of water, adjunct (where used) and cation source were first mixed under the specified time/temperature conditions. At this point the phosphate source was added, with additional mixing for about 2 minutes. The organic acid (usually anhydrous citric acid) was then added and mixing was continued under the listed time/temperature conditions. During these mixing steps, cold tap water was fed to the kettle jacket to maintain the temperature of the reaction mixture at about 100° F. or below.

After the initial mixing step was completed, a steam/water mixture was directed to the kettle jacket to begin heating the material therein. Mixing was continued during this step. When the temperature of the mixture reached about 200° F., a steam/water mix was employed to maintain the temperature level, and a final mixing step of about 30–60 minutes was conducted.

In certain instances the products were homogenized (3000–4000 psi first stage, about 500 psi second stage), and thereafter spray dried or drum dried to yield a powdered product which could be reconstituted in water.

The runs were analyzed for cations in solution, in order to determine the dispersibility of the resultant compounds in aqueous media. Cations in solution were determined by preparing 1% w/v dispersion in deionized water, whereupon the dispersions were centrifuged for about 3 minutes at high speed. The % yields were then determined by atomic absorption or emission techniques using conventional procedures. The nitrogen yield data was obtained by measurement with an ammonium ion-selective electrode after Kjeldahl digestion of the compound.

EXAMPLE 9
TABLE XIII

| Reaction Mixture (moles) | | Temp. (°F.)/Time (min.) | | Element | % Yield | % Solids | pH |
|---|---|---|---|---|---|---|---|
| Water | | 70 | | Ca | 109.35 | 8.94 | 6.46 |
| DL-Threonine[1] | 1.0 | 120 | 5 | | — | | |
| Ca(OH)$_2$ F.G.[1] | 1.8 | 100 | 1 | K | 99.22 | | |
| KOH (90%)[1] | 2.0 | 100 | 1 | | — | | |
| H$_3$PO$_4$ (75%)[1] | 1.0 | 100 | 1 | P | 106.52 | | |
| Citric Acid[1] | 1.0 | 100 | 1 | | — | | |
| | | 200 | 60 | N | 95.45 | | |

[1]Food Grade
Homogenizer Pressure "HP" - 3000 psi, 1st stage

EXAMPLE 10
TABLE XIV

| Reaction Mixture (moles) | | Temp. (°F.)/Time (min.) | | Element | % Yield | % Solids | pH |
|---|---|---|---|---|---|---|---|
| Water | | 70 | | Ca | 90.00 | 10.26 | 6.10 |
| DL-Methionine | 1.0 | 120 | 5 | | — | | |
| Ca(OH)$_2$ F.G. | 1.8 | 100 | 1 | K | 96.00 | | |
| KOH (90%) | 2.0 | | 1 | | — | | |
| H$_3$PO$_4$ (75%) | 1.0 | | 1 | P | 115.91 | | |
| Citric Acid | 1.0 | 100 | | | — | | |
| | | 200 | 60 | N | 97.50 | | |

"HP" - 3500 psi, 1st stage

EXAMPLE 11
TABLE XV

| Reaction Mixture (moles) | | Temp. (°F.)/Time (min.) | | Element | % Yield | % Solids | pH |
|---|---|---|---|---|---|---|---|
| Water | | 70 | | Ca | 136.46 | 8.07 | 6.20 |
| DL-Tryptophan | 1.0 | 120 | 10 | | — | | |
| Ca(OH)$_2$ F.G. | 1.8 | | 1 | K | 117.40 | | |
| KOH (90%) | 2.0 | | 1 | | — | | |
| H$_3$PO$_4$ (75%) | 1.0 | | 1 | P | 148.78 | | |

TABLE XV-continued

| Reaction Mixture (moles) | | Temp. (°F.)/Time (min.) | | Element | % Yield | % Solids | pH |
|---|---|---|---|---|---|---|---|
| Citric Acid | 1.0 | 90 | | | — | | |
| | | 200 | 60 | N | 8.11 | | |

"HP" - 3500 psi, 1st stage

EXAMPLE 12
TABLE XVI

| Reaction Mixture (moles) | | Temp. (°F.)/Time (min.) | | Element | % Yield | % Solids | pH |
|---|---|---|---|---|---|---|---|
| Water | | 70 | | Ca | 101.02 | 11.68 | 5.60 |
| L(+)Lysine.HCl | 1.0 | | 3 | | — | | |
| $Ca(OH)_2$ F.G. | 1.8 | | 1 | K | 91.67 | | |
| KOH (90%) | 2.0 | | 1 | | — | | |
| $H_3PO_4$ (75%) | 1.0 | | 1 | P | 111.90 | | |
| Citric Acid | 1.0 | 70 | | | — | | |
| | | 200 | 60 | N | 81.58 | | |

"HP" - 4000 psi, 1st stage only

EXAMPLE 13
TABLE XVII

| Reaction Mixture (moles) | | Temp. (°F.)/Time (min.) | | Element | % Yield | % Solids | pH |
|---|---|---|---|---|---|---|---|
| Water | | 70 | | Ca | 93.74 | 8.23 | 5.53 |
| *CSS 42 DE | 0.8 | | 5 | | — | | |
| $Ca(OH)_2$ F.G. | 1.4 | | 1 | As | 102.66 | | |
| $As_2O_3$ | 0.35 | | 1 | | — | | |
| KOH (90%) | 2.0 | | 1 | K | 88.64 | | |
| $H_3PO_4$ (75%) | 1.0 | | 1 | | — | | |
| Citric Acid | 1.0 | 70 | | P | 111.08 | | |
| | | 200 | 60 | | | | |

*Corn Syrup Solids
"HP" - 0

The material of Example 13 was not homogenized nor spray dried; upon synthesis thereof, it was tested by atomic absorption to give the percentage yield data set forth above.

EXAMPLE 14
TABLE XVIII

| Reaction Mixture | (moles) | Temp. (°F.) | Time (min.) | % Solids | pH |
|---|---|---|---|---|---|
| Water | | 70 | | 27.11 | 5.50 |
| C.S.S. 42 DE | 2.32 | | | | |
| $Ca(OH)_2$ | 3.59 | | | | |
| $Mg(OH)_2$ | 1.55 | | | | |
| ZnO | 0.0076 | | | | |
| Citric Acid | 2.90 | | | | |
| KOH (90%) | 5.80 | | | | |
| $H_3PO_4$ (75%) | 2.90 | | | | |
| $FeCl_2.4H_2O$ (30% soln.) | 0.062 | 200 | 45 | | |
| $Cu(NO_3)_2.3H_2O$ | 0.0016 | | | | |
| $MnSO_4.XH_2O$ (28.9% Mn) | 0.035 | | | | |
| $H_3BO_3$ | 0.092 | | | | |
| $Na_2MoO_4.2H_2O$ | 0.001 | 200 | 15 | | |
| $KNO_3$ | 5.795 | 150 | | | |
| Urea | 0.47 | 150 | 1 | | |
| $Ca(NO_3)_2.4H_2O$ | 0.90 | 90 | | | |
| $Mg(NO_3)_2.6H_2O$ | 0.373 | 90 | 1 | | |

Example 14 is illustrative of a plant nutrient material containing urea and other minerals important for plant life, particularly with respect to hydroponic growth of fruits and vegetables. The resultant liquid material was a totally soluble pale green solution which was not homogenized but spray dried immediately. The nitrogen portion contained 10% urea nitrogen and 90% $NO_3$ nitrogen. Although spray drying was used in this example, it is contemplated that drum drying techniques will be employed in commercial scale operations.

EXAMPLE 15

This is another example of a plant nutrient material which is in the form of a pale green solution. The material can be readily spray dried to give a pale green powder, and the latter is totally soluble in aqueous solution. The purpose of this example is to demonstrate the functionality of glycine as an adjunct in a plant nutrient material in accordance with the invention.

EXAMPLE 15
TABLE XIX

| Reaction Mixture | (moles) | Temp. (°F.) | Time (min.) | % Solids | pH |
|---|---|---|---|---|---|
| Water | | 70 | | 11.15 | 6.2 |
| Glycine | 1.59 | | | | |
| $Ca(OH)_2$ | 1.44 | | | | |
| $Mg(OH)_2$ | 1.05 | | | | |
| Citric Acid | 1.97 | | | | |
| $H_3PO_4$ (75%) | 1.97 | | | | |
| KOH (90%) | 3.95 | | | | |
| ZnO | 0.0052 | | | | |
| $FeCl_2.4H_2O$ (Soln. 30%) | 0.0423 | 200 | 45 | | |
| $Cu(NO_3)_2.3H_2O$ | 0.0011 | | | | |
| $MnSO_4.2H_2O$ | 0.0056 | | | | |
| $H_3BO_3$ | 0.0627 | | | | |
| $Na_2MoO_4.2H_2O$ | 0.00071 | 200 | 15 | | |
| $KNO_3$ | 5.29 | 120 | | | |
| $Ca(NO_3)_2.4H_2O$ | 0.61 | | | | |
| $Mg(NO_3)_2.6H_2O$ | 0.25 | 120 | 10 | | |

EXAMPLE 16
TABLE XX

| Reaction Mixture | (moles) | Grams | Temp. (°F.) | Time (min.) | % Solids | pH |
|---|---|---|---|---|---|---|
| Water | | 4462.0 | 70 | | 13.28 | 6.3 |

TABLE XX-continued

| Reaction Mixture | (moles) | Grams | Temp./Time (°F.) (min.) | | % Solids | pH |
|---|---|---|---|---|---|---|
| Corn Starch (Unmodified) | | 144.0 | | | | |
| α-amylase[2] | | 0.22 | 190 | 10 | | |
| Ca(OH)$_2$ | 1.75 | 129.67 | 70 | | | |
| KOH (90%) | 2.00 | 124.44 | | | | |
| H$_3$PO$_4$ (75%) | 1.00 | 130.67 | | | | |
| Citric Acid | 1.00 | 192.12 | 70 | | | |
| | | | 200 | 60 | 30 | |

[2]TakaTherm enzyme sold by Miles Laboratories

Example 16 illustrates the use of α-amylase treated starches as adjuncts for enhancing the dispersibility of the calcium-containing composition.

EXAMPLE 17

The zinc-containing material in accordance with this example was a light translucent liquid which was not homogenized but was spray dried to give a reconstitutable powder.

EXAMPLE 17

TABLE XXI

| Reaction Mixture (moles) | | Temp. (°F.)/Time (min.) | | Elements | % Yield | % Solids | pH |
|---|---|---|---|---|---|---|---|
| Water | | 140 | | Zn | 81.92 | 15.80 | 5.1 |
| ZnO | 1.0 | | 15 | | — | | |
| KOH (85%) | 3.2 | | | K | 95.96 | | |
| H$_3$PO$_4$ (75%) | 0.5 | | | | — | | |
| Citric Acid | 1.7 | 140 | | P | 70.26 | | |
| | | 200 | 15 | | | | |

EXAMPLE 18

TABLE XXII

| Reaction Mixture (moles) | | Temp. (°F.)/Time (min.) | | Elements | % Yield | % Solids | pH |
|---|---|---|---|---|---|---|---|
| Water | | 70 | | Ca | 87.10 | 16.56 | 6.6 |
| Na Caseinate | 0.0236 | 130 | 30 | | | | |
| Ca(OH)$_2$ | 8.14 | | | | | | |
| KOH (90%) | 4.88 | 70 | | | | | |
| H$_3$PO$_4$ (75%) | 2.71 | | | | | | |
| Citric Acid | 4.26 | 70 | | | | | |
| | | 200 | 60 | | | | |

Example 18 gave a milky white liquid which was homogenized at 3,000 psi first stage, 500 psi second stage, followed by spray drying. This example illustrates the use of sodium casienate as an adjunct.

EXAMPLE 19

TABLE XXIII

| Reaction Mixture (moles) | | Temp. (°F.)/Time (min.) | | Element | % Yield | % Solids | pH |
|---|---|---|---|---|---|---|---|
| Water | | 70 | | Ca | 85.04 | 18.70 | 6.25 |
| Glycine | 1.797 | | 1 | | | | |
| Ca(OH)$_2$ | 3.269 | | 1 | | | | |
| K$_2$HPO$_4$ | 1.797 | | 1 | | | | |
| Citric Acid | 1.797 | 70 | | | | | |
| | | 200 | 60 | | | | |

"HP" - 3500 psi, 1st stage

EXAMPLE 20

TABLE XXIV

| Reaction Mixture (moles) | | Gms | Temp. (°F.)/Time (min.) | | Elements | % Yield | % Solids | pH |
|---|---|---|---|---|---|---|---|---|
| Water | | 1500.0 | 70 | | Ca | 99.12 | 12.22 | 6.42 |
| Whey[3] (5.54% Solids) | | 1500.0 | 130 | 60 | | — | | |
| Protease HT | (0.2%) | .0165 | 130 | 210 | K | 113.04 | | |
| Ca(OH)$_2$ F.G. | 1.8 | 133.4 | 130 | 1 | P | 104.08 | | |
| KOH (90% tech.) | 2.0 | 124.7 | | | | — | | |
| H$_3$PO$_4$ (75%) | 1.0 | 130.7 | | 1 | N | 58.33 | | |
| Water | | 1100.0 | | | | — | | |
| Citric Acid | 1.0 | 192.12 | 130 | | | 1 | | |
| | | | 200 | 60 | | — | | |

[3]Whey/water solution pH 3.2 adjusted to 5.1 with KOH prior to addition of protease
"HP" - 3500 psi, 1st stage The nitrogen yield data set forth in Table XXIV was obtained by measurement with an ammonium ion-selective electrode after Kjeldahl digestion of the material. This yield figure demonstrates that the proteinaceous fraction of the starting materials remains in the final liquid product.

EXAMPLE 21

TABLE XXV

| Reaction Mixture (moles) | | Gms | Temp. (°F.)/Time (min.) | | Elements | % Yield | % Solids | pH |
|---|---|---|---|---|---|---|---|---|
| Water | | 1500.0 | 70 | | Ca | 101.75 | 13.24 | 6.15 |
| Whey[4] (5.54% Solids) | | 1500.0 | 130 | 60 | | — | | |
| Fungal Lactase | 4.0% | 2.13 | 130 | 210 | K | 107.25 | | |

TABLE XXV-continued

| Reaction Mixture (moles) | | Gms | Temp. (°F.)/Time (min.) | | Elements | % Yield | % Solids | pH |
|---|---|---|---|---|---|---|---|---|
| Ca(OH)₂ F.G. | 1.8 | 133.4 | 130 | 1 | P | 114.29 | | |
| KOH (90%) | 2.0 | 124.7 | | | | — | | |
| H₃PO₄ (75%) | 1.0 | 130.7 | | 1 | N | 112.5 | | |
| Water | | 1100.0 | | | | — | | |
| Citric Acid | 1.0 | 192.12 | 130 | 1 | | — | | |
| | | | 200 | 60 | | | | |

[4] Whey/water solution pH 3.2 adjusted to 5.1 with KOH prior to addition of fungal lactase
"HP" - 3000 psi, 1st stage

EXAMPLE 22

TABLE XXVI

| Reaction Mixture (moles) | | Gms | Temp. (°F.)/Time (min.) | | Elements | % Yield | % Solids | pH |
|---|---|---|---|---|---|---|---|---|
| Water | | 1500.0 | 70 | | Ca | 105.26 | 12.06 | 6.16 |
| Whey[5] (5.54% Solids) | | 1500.0 | | | | — | | |
| Fungal Lactase | 4.0% | 2.31 | 170 | 62 | K | 111.59 | | |
| HT Protease | 0.2% | .016 | 130 | 210 | P | 114.29 | | |
| Ca(OH)₂ F.G. | 1.8 | 133.4 | 130 | 1 | | — | | |
| KOH (90%) | 2.0 | 124.7 | | | N | 104.17 | | |
| H₃PO₄ (75%) | 1.0 | 130.7 | | 1 | | — | | |
| Water | | 1100.0 | | | | — | | |
| Citric Acid | 1.0 | 192.12 | 130 | 1 | | — | | |
| | | | 200 | 60 | | | | |

[5] Whey/water solution pH 3.2 adjusted to 4.9 with KOH prior to addition of the lactase and protease enzymes
"HP" - 3500 psi, 1st stage

EXAMPLE 23

TABLE XXVII

| Reaction Mixture (moles) | | Temp. (°F.)/Time (min.) | | Elements | % Yield | % Solids | pH |
|---|---|---|---|---|---|---|---|
| Water | | 70 | | Ca | 70.44 | 9.04 | 5.85 |
| CSS 42 DE | 0.80 | | 5 | | — | | |
| Ca(OH)₂ | 1.70 | | 1 | Ag | 34.26 | | |
| Ag(NO₃) | 0.60 | | 1 | | — | | |
| KOH (90%) | 2.00 | | 1 | K | 62.12 | | |
| H₃PO₄ (75%) | 1.00 | | 1 | | — | | |
| Citric Acid | 1.00 | 70 | | P | 87.06 | | |
| | | 200 | 60 | | | | |

"HP" - 3500 psi, 1st stage

EXAMPLE 24

TABLE XXVIII

| Reaction Mixture (moles) | | Temp. (°F.)/Time (min.) | | Elements | % Yield | % Solids | pH |
|---|---|---|---|---|---|---|---|
| Water | | 70 | | Ca | 37.46 | 7.74 | 5.82 |
| CSS 42 DE | 0.8 | | 5 | | — | | |
| Ca(OH)₂ | 1.4 | | 1 | Pb | 27.02 | | |
| PbO.H₂O | 0.2 | | 1 | | — | | |
| KOH (90%) | 2.0 | | 1 | K | 67.90 | | |
| H₃PO₄ (75%) | 1.0 | | 1 | | — | | |
| Citric Acid | 1.0 | 70 | | P | 120.67 | | |
| | | 200 | 60 | | | | |

"HP" - 3500 psi, 1st stage

EXAMPLE 25

TABLE XXIX

| Reaction Mixture (moles) | | Temp. (°F.)/Time (min.) | | Elements | % Yield | % Solids | pH |
|---|---|---|---|---|---|---|---|
| Water | | 70 | | Ca | 98.52 | 7.91 | 6.04 |
| CSS 42 DE | 0.8 | | 5 | | — | | |
| Ca(OH)₂ | 1.4 | | 1 | Bi | 52.11 | | |
| Bi(OH)₃ | 0.35 | | 1 | | — | | |
| KOH (90%) | 2.0 | | 1 | K | 55.51 | | |
| H₃PO₄ (75%) | 1.0 | | 1 | | — | | |
| Citric Acid | 1.0 | 70 | | P | 79.08 | | |
| | | 200 | 60 | | | | |

"HP" - 3500 psi, 1st stage

EXAMPLE 26

TABLE XXX

| Reaction Mixture (moles) | | Temp. (°F.)/Time (min.) | | Elements | % Yield | % Solids | pH |
|---|---|---|---|---|---|---|---|
| Water | | 70 | | Ba | 60.47 | 10.73 | 8.35 |

TABLE XXX-continued

| Reaction Mixture (moles) | | Temp. (°F.)/Time (min.) | | Elements | % Yield | % Solids | pH |
|---|---|---|---|---|---|---|---|
| CSS 42 DE | 0.8 | | 5 | | — | | |
| Ba(OH)$_2$.H$_2$O | 1.7 | | 1 | K | 114.00 | | |
| KOH (Tech. 90%) | 2.0 | | 1 | | — | | |
| H$_3$PO$_4$ (75%) | 1.0 | | 1 | P | 36.11 | | |
| Citric Acid | 1.0 | 70 | | | — | | |
| | | 200 | 60 | | | | |

"HP" - 3500 psi, 1st stage

EXAMPLE 27

TABLE XXXI

| Reaction Mixture (moles) | | Temp. (°F.)/Time (min.) | | Elements | % Yield | % Solids | pH |
|---|---|---|---|---|---|---|---|
| Water | | 70 | | B | 128.57 | 13.65 | 3.81 |
| Glycerol | 0.8 | | 5 | | — | | |
| H$_3$BO$_3$ | 2.0 | | 1 | K | 104.23 | | |
| KOH (90% Tech.) | 2.0 | | 1 | | — | | |
| H$_3$PO$_4$ (75%) | 1.0 | | 1 | P | 141.18 | | |
| Citric Acid | 1.0 | 70 | | | — | | |
| | | 200 | 60 | | | | |

EXAMPLE 28

TABLE XXXII

| Reaction Mixture (moles) | | Temp. (°F.)/Time (min.) | | Elements | % Yield | % Solids | pH |
|---|---|---|---|---|---|---|---|
| Water | | 70 | | Sr | 105.95 | 12.73 | 2.96 |
| CSS 42 DE | 0.8 | | 5 | | — | | |
| Sr(NO$_3$)$_2$ | 1.8 | | 1 | K | 101.09 | | |
| KOH (Tech 90%) | 2.0 | | 1 | | — | | |
| H$_3$PO$_4$ (75%) | 1.0 | | 1 | P | 154.55 | | |
| Citric Acid | 1.0 | 70 | | | — | | |
| | | 200 | 60 | | | | |

"HP" - 4000 psi, 1st stage

EXAMPLE 29

TABLE XXXIII

| Reaction Mixture (moles) | | Temp. (°F.)/Time (min.) | | Elements | % Yield | % Solids | pH |
|---|---|---|---|---|---|---|---|
| Water | | 70 | | Al | 85.33 | 12.80 | 5.92 |
| CSS 42 DE | 0.8 | | 5 | | — | | |
| Al(OH)$_3$ | 2.0 | | 1 | K | 100.00 | | |
| KOH (90% Tech.) | 2.0 | | 1 | | — | | |
| H$_3$PO$_4$ (75%) | 1.0 | | 1 | P | 93.02 | | |
| Citric Acid | 1.0 | 70 | | | — | | |
| | | 200 | 45 | | | | |

"HP" - 3700 psi, 1st stage

EXAMPLE 30

TABLE XXXIV

| Reaction Mixture (moles) | | Temp. (°F.)/Time (min.) | | Elements | % Yield | % Solids | pH |
|---|---|---|---|---|---|---|---|
| Water | | 70 | | V | 92.00 | 17.74 | 6.46 |
| CSS 42 DE | 0.8 | | 5 | | — | | |
| NH$_4$VO$_3$ | 1.0 | | 1 | K | 76.12 | | |
| KOH (90% Tech.) | 2.0 | | 1 | | — | | |
| H$_3$PO$_4$ (75% F.G.) | 1.0 | | 1 | P | 84.78 | | |
| Citric Acid | 1.0 | 70 | | | — | | |
| | | 200 | 60 | | | | |

"HP" - 0

EXAMPLE 31

TABLE XXXV

| Reaction Mixture (moles) | | Temp. (°F.)/Time (min.) | | Elements | % Yield | % Solids | pH |
|---|---|---|---|---|---|---|---|
| Water | | 70 | | Ti | 67.31 | 7.91 | 3.64 |
| CSS 42 DE | 0.8 | | 5 | | — | | |
| TiO(C$_2$O$_4$K)$_2$.2H$_2$O | 1.0 | | 1 | K | 83.43 | | |
| KOH (95% Tech.) | 2.0 | | 1 | | — | | |
| H$_3$PO$_4$ (75% F.G.) | 1.0 | | 1 | P | 79.41 | | |
| Citric Acid | 1.0 | 70 | | | — | | |
| | | 200 | 60 | | | | |

"HP" - 3500 psi, 1st stage

EXAMPLE 32
TABLE XXXVI

| Reaction Mixture (moles) | | Temp. (°F.)/Time (min.) | | Elements | % Yield | % Solids | pH |
|---|---|---|---|---|---|---|---|
| Water | | 70 | | Co | 75.32 | 11.2 | 6.43 |
| CSS 42 DE | 0.8 | | 5 | | — | | |
| Co(OH)$_2$ | 2.0 | | 1 | K | 96.58 | | |
| KOH (90% Tech.) | 2.0 | | 1 | | — | | |
| H$_3$PO$_4$ (75% F.G.) | 1.0 | | 1 | P | 47.62 | | |
| Citric Acid | 1.0 | 70 | | | — | | |
| | | 200 | 60 | | | | |

"HP" - 3500 psi, 1st stage

EXAMPLE 33
TABLE XXXVII

| Reaction Mixture (moles) | | Temp. (°F.)/Time (min.) | | Elements | % Yield | % Solids | pH |
|---|---|---|---|---|---|---|---|
| Water | | 70 | | Ca | 104.33 | 6.98 | 5.7 |
| CSS 42 DE | 0.8 | | 5 | | — | | |
| Ca(OH)$_2$ | 1.4 | | 1 | Ce | <20.41 | | |
| Ce(OH)$_4$ | 0.251 | | 1 | | — | | |
| KOH (90%) | 2.0 | | 1 | K | 106.56 | | |
| H$_3$PO$_4$ (75%) | 1.0 | | 1 | | — | | |
| Citric Acid | 1.0 | 70 | | P | 74.42 | | |
| | | 200 | 60 | | | | |

"HP" - 4000 psi, 1st stage

EXAMPLE 34
TABLE XXXVIII

| Reaction Mixture (moles) | | Temp. (°F.)/Time (min.) | | Elements | % Yield | % Solids | pH |
|---|---|---|---|---|---|---|---|
| Water | | 70 | | Ca | 87.43 | 7.90 | 6.56 |
| CSS 42 DE | 0.8 | 5 | | | — | | |
| Ca(OH)$_2$ | 1.4 | | 1 | Cd | 59.62 | | |
| Cd(OH)$_2$ | 0.6 | | 1 | | — | | |
| KOH (90%) | 2.0 | | 1 | K | 106.48 | | |
| H$_3$PO$_4$ (75%) | 1.0 | | 1 | | — | | |
| Citric Acid | 1.0 | 70 | | P | 101.45 | | |
| | | 200 | 60 | | | | |

"HP" - 3500 psi, 1st stage

EXAMPLE 35
TABLE XXXIX

| Reaction Mixture (moles) | | Temp. (°F.)/Time (min.) | | Elements | % Yield | % Solids | pH |
|---|---|---|---|---|---|---|---|
| Water | | 70 | | Si | 45.65 | 14.31 | 4.10 |
| CSS 42 DE | 0.8 | | 5 | | — | | |
| K$_2$Si$_2$O$_5$ | 0.438 | | 1 | K | 87.37 | | |
| KOH (90%) | 2.0 | | 1 | | — | | |
| H$_3$PO$_4$ (75%) | 1.0 | | 1 | P | 85.11 | | |
| Citric Acid | 1.0 | 70 | | | — | | |
| | | 200 | 120 | | | | |

"HP" - 0

EXAMPLE 36
TABLE XL

| Reaction Mixture (moles) | | Temp. (°F.)/Time (min.) | | Elements | % Yield | % Solids | pH |
|---|---|---|---|---|---|---|---|
| Water | | 70 | | Ca | 94.27 | 13.24 | 6.2 |
| CSS 42 DE | 0.8 | | 5 | | — | | |
| Ca(OH)$_2$ F.G. | 1.4 | | 1 | Se | 275.48 | | |
| Na$_2$SeO$_4$.10H$_2$O | 0.2 | | 1 | | — | | |
| KOH (90%) | 2.0 | | 1 | K | 98.11 | | |
| H$_3$PO$_4$ (75%) | 1.0 | | 1 | | — | | |
| Citric Acid | 1.0 | 70 | | P | 96.77 | | |
| | | 200 | 60 | | | | |

"HP" - 3500 psi, 1st stage

EXAMPLE 37
TABLE XLI

| Reaction Mixture (moles) | | Temp. (°F.)/Time (min.) | | Elements | % Yield | % Solids | pH |
|---|---|---|---|---|---|---|---|
| Water | | 70 | | Sb | 109.67 | 16.82 | 3.8 |
| CSS 42 DE | 0.8 | | 2 | | — | | |
| Antimony Potassium Tartrate | 1.0 | | 1 | K | 78.29 | | |
| K$_2$HPO$_4$ | 1.0 | | 1 | P | 121.96 | | |

TABLE XLI-continued

| Reaction Mixture (moles) | | Temp. (°F.)/Time (min.) | | Elements | % Yield | % Solids | pH |
|---|---|---|---|---|---|---|---|
| Citric Acid | 1.0 | 70 | | | — | | |
| | | 200 | 60 | | | | |

EXAMPLE 38

TABLE XLII

| Reaction Mixture (moles) | | Temp. (°F.)/Time (min.) | | Elements | % Yield | % Solids | pH |
|---|---|---|---|---|---|---|---|
| Water | | 70 | | Sn | 24.85 | 16.90 | 1.05 |
| CSS 42 DE | 0.8 | | 2 | | — | | |
| $SnCl_2 \cdot 2H_2O$ | 2.0 | | 1 | K | 114.64 | | |
| $K_2HPO_4$ | 1.0 | | 1 | | — | | |
| Citric Acid | 1.0 | 70 | | P | 16.56 | | |
| | | 200 | 60 | | | | |

EXAMPLE 39

TABLE XLIII

| Reaction Mixture (moles) | | Temp. (°F.)/Time (min.) | | Elements | % Yield | % Solids | pH |
|---|---|---|---|---|---|---|---|
| Water | | 70 | | Ca | 84.66 | 17.859 | 6.65 |
| CSS 42 DE | 0.8 | | 3 | | | | |
| $Ca(OH)_2$ | 2.0 | | 1 | K | 104.22 | | |
| KOH (87%) | 1.0 | | 1 | | | | |
| $H_3PO_4$ (75%) | 1.0 | | 1 | P | 108.96 | | |
| Choline Dihydrogen Citrate | 1.0 | 70 | | | | | |
| | | 200 | 60 | | | | |

This examples illustrates the use of gelatin as an adjunct with protease enzyme.

EXAMPLE 41

TABLE XLV

| Reaction Mixture (moles) | | Gms | Temp. (°F.)/Time (min.) | | Elements | % Yield | % Solids | pH |
|---|---|---|---|---|---|---|---|---|
| Water | | 3818.7 | 70 | | Ca | 107.11 | 11.52 | 5.69 |
| Soy-wheat protein isolate | | 180.0 | | | K | 115.03 | | |
| HT Protease (0.5% Protein Basis) | | 1.0 | 130 | 180 | | — | | |
| $Ca(OH)_2$ | 1.8 | 133.4 | 70 | 1 | P | 108.16 | | |
| KOH (90%) | 2.0 | 124.7 | | 1 | | — | | |
| $H_3PO_4$ (75%) | 1.0 | 130.7 | | 1 | | — | | |
| Citric Acid | 1.0 | 192.12 | 70 | | | — | | |
| | | | 200 | 60 | | | | |

[7]Gunther 1205 soy-wheat isolate; pH adjusted to 6.85 with KOH prior to protease addition
"HP" - 3500, 1st stage The material of this example gave a white homogeneous liquid which was drum dried to yield a final powder. This example demonstrates the use of choline dihydrogen citrate as a citric acid source.

EXAMPLE 40

TABLE XLIV

| Reaction Mixture (moles) | | Gms | Temp. (°F.)/Time (min.) | | Elements | % Yield | % Solids | pH |
|---|---|---|---|---|---|---|---|---|
| Water | | 3818.7 | 70 | | Ca | 110.47 | 12.07 | 5.76 |
| Gelatin[6] | | 180.7 | | | | — | | |
| HT Protease | (0.5%) | 1.0 | 130 | 180 | K | 104.67 | | |
| $Ca(OH)_2$ | 1.8 | 133.4 | 70 | 1 | | | | |
| KOH (90%) | 2.0 | 124.7 | | 1 | P | 117.70 | | |
| $H_3PO_4$ (75%) | 1.0 | 130.7 | | 1 | | — | | |
| Citric Acid | 1.0 | 192.12 | 70 | | | — | | |
| | | | 200 | 60 | | | | |

"HP" - 3500 psi, 1st stage
[6]pH adjusted to 6.88 prior to addition of protease

EXAMPLE 42

TABLE XLVI

| Reaction Mixture (moles) | | Gms | Temp. (°F.)/Time (min.) | | Elements | % Yield | % Solids | pH |
|---|---|---|---|---|---|---|---|---|
| Water | | 4350.0 | 70 | | Ca | 67.1 | 13.35 | 5.6 |
| Fluid Whey (5.5% solids) | | 2550.0 | | | | | | |
| $K_2HPO_4$ | 1.0 | 312.75 | | | | — | | |
| Citric Acid | 1.0 | 345.00 | 150 | 15 | | — | | |
| $Ca(OH)_2$ | 1.75 | 242.25 | | | | — | | |

TABLE XLVI-continued

| Reaction Mixture (moles) | Gms | Temp. (°F.)/Time (min.) | | Elements | % Yield | % Solids | pH |
|---|---|---|---|---|---|---|---|
| | | 200 | 45 | | | | |

"HP" - 3500 psi, 1st stage

In this example the calcium hydroxide was added last to minimize any complexing between the lactose present in the fluid whey and calcium ion. The result was a tan, viscous suspension of pH 5.6.

EXAMPLE 43
TABLE XLVII

| Reaction Mixture (moles) | | Temp. (°F.)/Time (min.) | | Element | % Yield | % Solids | pH |
|---|---|---|---|---|---|---|---|
| Water | | 70 | | Cr | 126.27 | 13.27 | 1.18 |
| CSS 42 DE | 0.8 | | 5 | K | 90.47 | | |
| Cr(NO$_3$)$_3$.9H$_2$O | 2.0 | | 1 | P | 124.35 | | |
| KOH (90%) | 2.0 | | 1 | | | | |
| H$_3$PO$_4$ (75%) | 1.0 | | 1 | | | | |
| Citric Acid | 1.0 | 70 | | | | | |
| | | 200 | 60 | | | | |

"HP" - 0

EXAMPLE 44
TABLE XLVIII

| Reaction Mixture (moles) | | Temp. (°F.)/Time (min.) | | Element | % Yield | % Solids | pH |
|---|---|---|---|---|---|---|---|
| Water | | 70 | | Ca | 98.90 | 12.41 | 6.4 |
| CSS 42 DE | 0.8 | | 5 | | — | | |
| Ca(OH)$_2$F.G. | 1.7 | | 1 | Hg | 62.50 | | |
| HgO Red | 0.3 | | 1 | | — | | |
| KOH (90%) | 2.0 | | 1 | K | 97.15 | | |
| H$_3$PO$_4$ (75%) | 1.0 | | 1 | | — | | |
| Citric Acid | 1.0 | 70 | | P | 104.88 | | |
| | | 200 | 60 | | | | |

"HP" - 3500 psi, 1st stage

EXAMPLE 45

In this example commercially available soybean meal was initially treated with protease enzyme, whereupon the resultant material was used as an adjunct in a calcium-containing composition. Specifically, five pounds of soybean meal was added to 3.5 gallons of water (70° F.), whereupon the mixture was heated to 200° F. for a period of two hours, followed by cooling to 140° F. The pH of the mixture was then adjusted to 5.5 with phosphoric acid. At this point α-amylase (Miles TakaTherm) was added at a level of 0.05% by weight, followed by heating with mixing at 190° F. for 25 minutes. The pH was next adjusted to 6.7 with potassium hydroxide, and protease enzyme (0.22% by weight) was added. This mixture was stirred at 130° F. for 40 minutes, followed by additional stirring at 70° F. for 24 hours. At this point 0.05% α-amylase was added, followed by stirring at 190° F. for 20 minutes. The mixture was then filtered and a light tan solution was obtained.

The soybean meal extract obtained in the foregoing manner was used as an adjunct in the following example, wherein conditions of addition and the like are as set forth in Examples 9–44.

EXAMPLE 45
TABLE XLIX

| Reaction Mixture (moles) | Gms | Temp. (°F.)/Time (min.) | | Elements | % Yield | % Solids | pH |
|---|---|---|---|---|---|---|---|
| Water | 800.0 | 70 | | Ca | 100.83 | 12.19 | 8.22 |
| Soybean Meal | | | | | | | |
| Extract (9.4% Solids) | 4685.0 | | | N | 100.28 | | |
| Ca(OH)$_2$ | 1.8 | 133.4 | 1 | | — | | |
| KOH (90%) | 1.5 | 93.5 | 1 | | — | | |
| H$_3$PO$_4$ (75%) | 1.0 | 130.7 | 1 | | — | | |
| Citric Acid | 0.5 | 96.06 | 70 | | — | | |
| | | 200 | 60 | | | | |

"HP" - 3700 psi, 1st stage

The foregoing illustrates the use of a soybean meal extract as an adjunct in conjunction with the mineral-containing compositions of the invention.

EXAMPLE 46

In this example the bioavailability of the minerals in four compositions in accordance with the present invention were tested. The minerals tested for were iron, magnesium, zinc and calcium.

A. Iron Experiment

In this case the composition in accordance with the invention containing, by analysis, 16.5% iron, 17.25% potassium, 11.57% phosphorous and 39.26% citrate was employed.

While control rats on the low-iron diet remained anemic, those fed iron-supplemented diets showed rapid regeneration of Hb. Comparison of diets with identical iron content (using the conventional iron source ferrous sulfate and that of the invention) showed that the extent of Hb regeneration was almost identical. Since body weight gain and diet (hence iron) intake between comparable groups did not differ significantly, similarity of Hb values suggests that the iron in the composition of the invention was as well available as that in ferrous sulfate. Relative bioavailabilities calculated by three different methods led to a similar conclusion. Calculated by the standard AOAC method, the relative bioavailability of iron using the composition of the invention was 101% (ferrous sulfate=100%).

B. Magnesium, Zinc and Calcium Experiments

The magnesium-containing compound in accordance with the invention was 5.49% magnesium, 12.17% potassium, 4.36% phosphorous, 33.78% citrate and 20.25% carbohydrate. The zinc-containing composition contained 8.41% zinc, 22.16% potassium, 2.28% phosphorous and 51.25% citrate. The calcium-containing composition contained 11.19% calcium, 13.19% potassium, 5.83% phosphorous, 28.40% citrate and 21.31% carbohydrate. The comparative mineral sources used to determine relative bioavailability were magnesium carbonate, zinc carbonate and calcium sulfate.

Male weanling rats (Sprague-Dawley), housed in stainless steel cages and under a controlled environment, were offered basal and mineral supplemented diets for a period of 4 weeks (8 rats per diet). In these three experiments, and in the iron experiment above, diet and deionized water were offered ad libitum. Data on growth response, diet intake, and serum and femur mineral concentration were collected. Relative bioavailability was assessed based on retention of the test mineral in the femur in response to graded dietary levels of the test mineral (dose response relationship).

Mineral contents of mineral supplements, resultant diets, and tissues (serum and femur) were determined by atomic absorption spectrophotometry using an IL (Instrumentation Laboratories, Inc.) model 251 spectrophotometer.

The Mg-supplemented diets greatly improved the performance parameters of the rats. No mortality was encountered on Mg-supplemented diets in contrast to the Mg-deficient diet, where a sizable mortality occurred. Although Mg from the composition of the invention appeared to be quite well available, both serum Mg and femur Mg levels for the sample of the composition of the invention tended to be somewhat low as compared to the reference source (magnesium carbonate). In addition to femur Mg levels, some prior workers have used serum Mg levels as an indicator of bioavailability. However, others have found serum Mg concentration to be less suitable for this bioassay due to a somewhat non-linear response. The degree of correlation between femur Mg and dietary Mg is quite high, however, and thus, femur Mg was chosen as the parameter for calculation of bioavailability. Four different approaches were taken for this calculation. By the most appropriate method, the relative bioavailability of Mg in the composition of the invention was 88.8% ($MgCO_3$=100%).

The addition of Zn to the Zn-deficient diet dramatically improved the performance parameters of the rats during the 4-week experiment. Mortality on the Zn deficient diet was not observed, since it normally does not occur in shortterm feeding studies. Zn from the composition of the invention appeared to be quite available. Although some have used growth response and serum Zn levels as test criteria to assess bioavailability, femur Zn level is most sensitive to dietary Zn intakes and has come to be recognized as the parameter of choice. Bioavailability of Zn in the composition of the invention was calculated by a number of different methods. By the most appropriate method, the relative bioavailability of Zn in Bio-Zn-10 was 83.8% ($ZnCO_3$=100%).

The addition of Ca to the basal Ca diet greatly improved the performance characteristics of the rats, with the increase in femur weight, ash and Ca content being most marked. These parameters were, thus, used to calculate bioavailabilities. Serum Ca level is little affected by dietary Ca levels, and thus cannot be used as a test criterion. The femoral ash and Ca contents, however, suggest that Ca in the reference compound was more available than that in the composition of the invention. The relative bioavailability of Ca was calculated by a number of different approaches. Unlike the other experiments, however, the calculated values differed markedly depending on the method used. By the slope ratio method, the relative bioavailability of Ca in Bio-ca-1 was only 55%. Since most (over 99%) of the Ca absorbed is deposited in the bone mass, calculations based on increases in the Ca content of the femur seem more suitable. Calculation by this method results in a relative bioavailability value of 62.3%. Strict comparison (between comparable diets) of femur Ca content however, indicates relative bioavailabilities to be higher.

It will therefore be seen that the bioavailability of minerals forming a part of the composition of the invention is good. With respect to the reference compounds employed in the foregoing tests, it should be understood that these have problems which limit their usefulness. For example, ferrous sulfate has an unpleasant taste, and tends to enhance the oxidative rancidity of fat. Magnesium and zinc carbonate likewise have unpleasant tastes and are less than optimum from this standpoint. Finally, calcium phosphate is rather insoluble and therefore the usefulness thereof is limited, particularly in liquid materials.

EXAMPLE 47

This example illustrates the preparation of a water soluble iron-containing composition in accordance with the invention, using elemental iron as the mineral source rather than an iron compound.

In this procedure the iron is first ionized in the presence of the citric-phosphoric acid source, followed by neutralization with potassium hydroxide. The resultant product, a dark green fluid, was homogenized at 3500 psi first stage and 500 psi second stage, filtered and spray dried yielding a fine, water-soluble dark green powder. Optionally the fluid may be drum-dried. The materials and quantities used, as well as the reaction parameters, are set forth in the following Table:

TABLE L

| Ingredient | Moles | Grams | Temp. | Time |
| --- | --- | --- | --- | --- |
| Water | | 12,780.0 | 70° F. | |
| Citric Acid Anhyd. | 4.50 | 864.5 | 70° F. | |
| Phosphoric Acid (75%) | 4.50 | 588.0 | 70° F. | |
| Reduced Iron Powder | 7.45 | 415.9 | 150° F. | 4 hrs. |
| | | | 70° F. | 24 hrs. |
| Potassium Hydroxide | 10.30 | 680.0 | 70° F. | |
| | | | 200° F. | 2 hrs. |

The powdered product was analyzed by atomic absorption techniques as previously described, and gave the following results, based upon percent of theoretical yield: iron, 101.4%; potassium, 112.9%; and phosphorous, 112.4%.

EXAMPLE 48

Two additional preparations were made using elemental iron as the cation source. However, two different tricarboxylic acids were substituted for half of the normal citric acid at a 1:1 molar ratio. Each of the fluid compositions was prepared as described above, with time/temperature conditions as noted in the following tables. In each case the fluid product was filtered and drum dried without homogenization, yielding a fine, soluble green powder.

TABLE LI

| Ingredient | Moles | Grams | Temp. | Hold Time |
|---|---|---|---|---|
| Water | | 2871.8 | 70° F. | |
| Phosphoric Acid (75%) | 1.0 | 130.7 | 70° F. | 1 min. |
| Citric Acid, Anhyd. | 0.5 | 96.1 | 70° F. | 1 min. |
| Nitrilotriacetic Acid | 0.5 | 95.6 | 70° F. | 1 min. |
| Reduced Iron Powder | 1.65 | 92.4 | 140° F. | 90 min. |
| | | | 70° F. | 48 hrs. |
| | | | 200° F. | 150 min. |
| Potassium Hydroxide (90%) | 2.0 | 124.7 | 200° F. | 60 min. |

TABLE LII

| Ingredient | Moles | Grams | Temp. | Time |
|---|---|---|---|---|
| Water | | 3392.0 | 70° F. | |
| Phosphoric Acid (75%) | 1.0 | 130.7 | 70° F. | 1 min. |
| Citric Acid Anhyd. | 0.5 | 96.1 | 70° F. | 1 min. |
| DTPA - Pentasodium salt[1] (41% sol'n) | 0.5 | 612.2 | 70° F. | 1 min. |
| Reduced Iron Powder | 1.65 | 92.4 | 140° F. | 90 min. |
| | | | 70° F. | 48 hrs. |
| | | | 200° F. | 150 min. |
| Potassium Hydroxide (90%) | 0.89 | 50.0 | 200° F. | 60 min. |

[1]Diethylenetriaminepentaacetic Acid Pentasodium salt

Atomic absorption analysis of the products indicated that the percent of theoretical yield of iron was, respectively, 96.8% and 74.6%.

EXAMPLE 49

This example illustrates the use of L-Glutamic acid as an adjunct in the preparation of a calcium-containing composition.

This composition was prepared in the manner outlined above with the following exceptions. The adjunct was added after the calcium and phosphate sources and the preparation was homogenized at 4000 psi first stage and 500 psi second stage and allowed to cool to room temperature prior to the addition of the citric acid. It was subsequently heated to 250° F. in a pressure cooker for 30 minutes. The product was analyzed both before and after addition of the citric acid with the following results. Before citric acid addition the percent theoretical yield was 0.1% for calcium, 8.6% for potassium, 4.2% for phosphorous. After citric acid addition, the results were 54% for calcium, 114.9% for potassium, and 87.9% for phosphorous. The following table sets forth the reaction parameters:

TABLE LIII

| Ingredient | Moles | Grams | Temp. | Hold Time |
|---|---|---|---|---|
| Water | | 3667.5 | 70° F. | |
| Calcium Hydroxide | 1.8 | 133.4 | 70° F. | 1 min. |
| Potassium Hydroxide (90%) | 2.0 | 124.67 | 70° F. | 1 min. |
| Phosphoric Acid (75%) | 1.0 | 130.67 | 70° F. | 1 min. |
| L-Glutamic Acid | 1.0 | 147.13 | 70° F. | |
| | | | 200° F. | 60 min. |
| Citric Acid | 0.4 | 84.13 | 70° F. | |
| | | | 250° F. | 30 min. |

EXAMPLE 50

In this example an iron-containing composition employing the sodium salt of ethylene-bis(alpha-imino-2-hydroxy-5-sulfophenyl acetic acid) (I) was employed as a partial substitution for the normally employed citric acid. The composition and results of elemental analyses are given in Table LIV.

In a 2.5 gallon jacketed kettle, water, citric acid, phosphoric acid and the sodium salt of (I) were mixed at room temperature with stirring followed by heating to 140° F. Slight fizzing was observed. Iron powder was then slowly added to the mixture. The mixture appeared to be boiling due to the evolution of gas ($H_2$). When the gas evolution had subsided somewhat, the temperature of the mixture was raised to 200° F. and held for 1.5 hours. Potassium hydroxide was added and heating was continued for 30 minutes. The resultant solution (pH 5.54) was filtered, and the %-Fe in the filtrate was determined by atomic absorption.

EXAMPLE 50

TABLE LIV

| Reaction Mixture (moles) | | Temp. (°F.)/Time (min.) | | Elements | % Yield | % Solids | pH |
|---|---|---|---|---|---|---|---|
| Water | | 70 | | Fe | 29.6 | 18.52 | 5.54 |
| Citric Acid (50%) | 1.4 | | | | — | | |
| Phosphoric Acid (75%) | 2.1 | | | K | 82.7 | | |
| Sodium Salt of (I) (43.6% Solids) | 0.7 | 140 | 15 | P | 91.8 | | |
| Reduced Iron Powder (Feed Grade) | 4.0 | 200 | 90 | | | | |
| Potassium hydroxide (90% Tech.) | 2.0 | 200 | 30 | | | | |

Examples 51 through 53 illustrate the use of ammonium ion as an alternative to alkali metal ion.

EXAMPLE 51

TABLE LV

| Reaction Mixture (moles) | | Temp. (°F.)/Time (min.) | | Elements | % Yield | % Solids | pH |
|---|---|---|---|---|---|---|---|
| Water | | 90 | | Ca | 97.93 | 13.50 | 5.57 |
| CSS 42 DE | 1.0 | 90 | 5 | | | | |
| Ca(OH)$_2$ (F.G.) | 1.7 | 90 | 1 | K | 108.80 | | |
| KOH (F.G. 87%) | 1.0 | 90 | 1 | | | | |

TABLE LV-continued

| Reaction Mixture (moles) | | Temp. (°F.)/Time (min.) | | Elements | % Yield | % Solids | pH |
|---|---|---|---|---|---|---|---|
| NH$_4$OH (28.9% NH$_3$) | 1.0 | 90 | 1 | P | 107.46 | | |
| H$_3$PO$_4$ (F.G. 75%) | 1.0 | 90 | 1 | | | | |
| Citric Acid (Anhyd.) | 1.0 | 90 | | N | 118.42 | | |
| | | 200 | 60 | | | | |

"HP" - 0

EXAMPLE 52

TABLE LVI

| Reaction Mixture (moles) | | Temp. (°F.)/Time (min.) | | Elements | % Yield | % Solids | pH |
|---|---|---|---|---|---|---|---|
| Water | | 90 | | Ca | 85.37 | 11.35 | 6.40 |
| CSS 42 DE | 0.8 | 90 | 5 | P | 90.02 | | |
| Ca(OH)$_2$ (F.G.) | 2.0 | 90 | 1 | | | | |
| NH$_4$OH (28.9% NH$_3$) | 2.0 | 90 | 1 | N | 112.46 | | |
| H$_3$PO$_4$ (F.G. 75%) | 1.0 | 90 | 1 | | | | |
| Citric Acid (Anhyd.) | 1.0 | 200 | 60 | | | | |

"HP" - 0

EXAMPLE 53

TABLE LVII

| Reaction Mixture (moles) | | Temp. (°F.)/Time (min.) | | Elements | % Yield | % Solids | pH |
|---|---|---|---|---|---|---|---|
| Water | | 90 | | | | 14.32 | 8.04 |
| CSS 42 DE | 0.8 | 90 | 5 | Ba | 54.37 | | |
| Ba(OH)$_2$.H$_2$O | 1.8 | 90 | 1 | P | 57.06 | | |
| NH$_4$OH (28.9% NH$_3$) | 2.0 | 90 | 1 | N | 78.2 | | |
| H$_3$PO$_4$ (75%) | 1.0 | 90 | 1 | | | | |
| Citric Acid (Anhyd.) | 1.0 | 90 | | | | | |
| | | 200 | 60 | | | | |

"HP" - 0

We claim:

1. A composition of matter which includes a moiety of the generalized formula

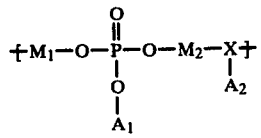

wherein

M$_1$ and M$_2$ are polyvalent and respectively taken from the group consisting of arsenic, silver, aluminum, barium, bismuth, mercury, lead, antimony, tin, beryllium, cadmium, cobalt, chromium, selenium, silicon, strontium, titanium and vanadium, A$_1$ and A$_2$ are respectively taken from the group consisting of hydrogen, ammonium and the alkali metals, and X is an organic acid moiety having at least three carboxyl groups therein.

2. The composition of matter as set forth in claim 1 wherein A$_1$ and A$_2$ are respectively taken from the group consisting of hydrogen, ammonium, lithium, potassium and sodium.

3. The composition of matter as set forth in claim 1 wherein said acid moiety is a citrate moiety of the formula $$-\!\!\left[-O-\overset{O}{\underset{\|}{C}}-CH_2-\underset{\underset{\underset{O}{|}}{\underset{C=O}{|}}}{\overset{OH}{\underset{|}{C}}}-CH_2-\overset{O}{\underset{\|}{C}}-O-\right]\!\!-$$

4. The composition of matter as set forth in claim 1 wherein the composition is in the form of a polymer having a molecular weight exceeding 300,000.

5. The composition of matter as set forth in claim 4 wherein said polymer is dispersible in aqueous media.

6. The composition of matter as set forth in claim 1 wherein at least about 30% by weight of the theoretically available quantities of M$_1$ and/or M$_2$ will remain dispersed in water at ambient temperatures.

7. The composition of matter as set forth in claim 1, including an adjunct selected from the group consisting of the amino acids, starches, sugars, whey, the caseinates, and hydrolyzates of animal, vegetable and marine protein sources.

8. A water dispersible composition of matter which is a polymer or quasi-polymer having a molecular weight exceeding 300,000 and includes a moiety of the generalized formula

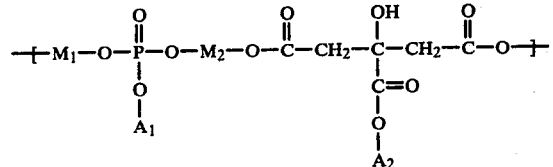

wherein
- $M_1$ and $M_2$ are polyvalent and respectively taken from the group consisting of arsenic, silver, aluminum, barium, bismuth, mercury, lead, antimony, tin, beryllium, cadmium, cobalt, chromium, selenium, silicon, strontium, titanium and vanadium, and
- $A_1$ and $A_2$ are respectively taken from the group consisting of hydrogen, ammonium and the alkali metals.

9. A method of synthesizing metal-containing products having a high degree of dispersibility in aqueous media, comprising the steps of:
 forming an admixture by admixing in an aqueous medium respective quantities of:
  (1) a cation source selected from the group consisting of compounds of arsenic, silver, aluminum, barium, bismuth, mercury, lead, antimony, tin, beryllium, cadmium, cobalt, chromium, selenium, silicon, strontium, titanium and vanadium,
  (2) a hydrogen, alkali metal or ammonium phosphate source; and
  (3) an organic acid having at least three carboxyl groups therein,
 the molar ratios of said reactants being such that the ratio for phosphate ion to acid is from about 0.5:1 to 3:1; for hydrogen, alkali metal or ammonium ions to phosphate, from about 0.5:1 to 3:1; for non-alkali metal cations to acid, from about 1:1 to 5:1; and for hydrogen, alkali metal or ammonium ions to acid, from about 0.5:1 to 7:1;
 heating said admixture for a sufficient period of time and at a temperature to yield said products.

10. The method as set forth in claim 9 wherein said acid is citric acid.

11. The method as set forth in claim 9 wherein said molar ratios most preferably are for phosphate ion to acid, about 1:1; for hydrogen, alkali metal or ammonium ions to phosphate ions, about 2:1; for non-alkali metal cations to phosphate, about 2:1; for non-alkali metal cations to acid, about 2:1; and for the hydrogen, alkali metal or ammonium ions to acid, about 2:1.

12. The method as set forth in claim 9 wherein said admixture is maintained at a temperature of room temperature or below during said admixing step.

13. The method as set forth in claim 12 wherein said heating step includes heating said admixture to a temperature of from about 150° F. to 400° F., and thereafter further admixing the admixture at said temperature for a period of from about 10 minutes to 7 hours.

14. The method as set forth in claim 9 including the steps of homogenizing said product and thereafter drying the same to give a dried product.

15. The method as set forth in claim 9, wherein an adjunct is added to said admixture for enhancing the aqueous dispersibility of the resulting compositions.

16. The method as set forth in claim 15, wherein said adjunct is selected from the group consisting of maltodextrins and corn syrup, ranging in D.E. from 1-100, sucrose, dextrose, galactose, arabinose, ribose, xylose, maltose, lactose, raffinoise, fructose and polyalcohols, starches, the amino acids, whey, the caseinates, and hydrolyzates of animal, vegetable and marine protein sources.

17. The compositions of matter produced by the process defined in claim 9.

18. A method of synthesizing metal-containing products having a high degree of dispersibility in aqueous media, comprising the steps of:
 forming an admixture by admixing in an aqueous medium respective quantities of:
  (1) a cation source selected from the group consisting of compounds of calcium, magnesium, iron, copper, boron, zinc, manganese, molybdenum, arsenic, silver, aluminum, barium, bismuth, mercury, nickel, lead, antimony, tin, beryllium, cadmium, cobalt, chromium, selenium, silicon, strontium, titanium and vanadium,
  (2) a hydrogen, alkali metal or ammonium phosphate source; and
  (3) an organic acid having at least three carboxyl groups therein; and
 heating said admixture for a sufficient period of time and at a temperature to yield said products,
 the molar ratios of said reactants also being such as to yield said products.

19. The compositions of matter produced by the process defined in claim 18.

20. A composition of matter which includes a moiety of the generalized formula

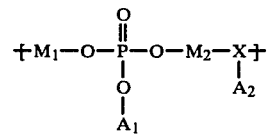

wherein
- $M_1$ and $M_2$ are polyvalent and respectively taken from the group consisting of calcium, magnesium, zinc, iron, nickel, copper, boron, manganese and molybdenum,
- one of said $A_1$ and $A_2$ is ammonium and the other of said $A_1$ and $A_2$ being taken from the group consisting of hydrogen, ammonium and the alkali metals, and
- X is an organic acid moiety having at least three carboxyl groups therein.

21. The composition of matter as set forth in claim 20 wherein said acid moiety is a citrate moiety of the formula

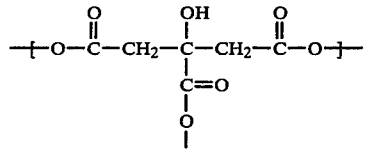

22. The composition of matter as set forth in claim 20 wherein the composition is in the form of a polymer having a molecular weight exceeding 300,000.

23. The composition of matter as set forth in claim 22 wherein said polymer is dispersible in aqueous media.

24. The composition of matter as set forth in claim 20 wherein at least about 30% by weight of the theoretically available quantities of $M_1$ and $M_2$ will remain dispersed in water at ambient temperatures.

25. The composition of matter as set forth in claim 20, including an adjunct selected from the group consisting of the amino acids, starches, sugars, whey, the caseinates, and hydrolyzates of animal, vegetable and marine protein sources.

26. A water dispersible composition of matter which is a polymer or quasi-polymer having a molecular weight exceeding 300,000 and includes a moiety of the generalized formula

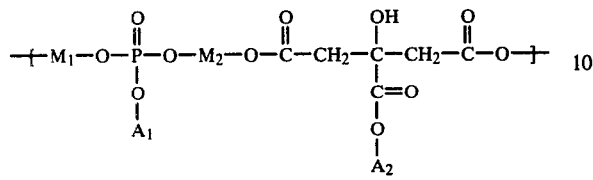

wherein
- $M_1$ and $M_2$ are polyvalent and respectively taken from the group consisting of calcium, magnesium, zinc, iron, nickel, copper, boron, manganese and molybdenum
- one of said $A_1$ and $A_2$ is ammonium and the other of said $A_1$ and $A_2$ being taken from the group consisting of hydrogen, ammonium and the alkali metals, and
- X is an organic acid moiety having at least three carboxyl groups therein.

27. A method of synthesizing metal-containing products having a high degree of dispersibility in aqueous media, comprising the steps of:
forming an admixture by admixing in an aqueous medium respective quantities of:
(1) a cation source selected from the group consisting of compounds of calcium, magnesium, zinc, iron, nickel, copper, boron, manganese and molybdenum,
(2) an ammonium phosphate source; and
(3) an organic acid having at least three carboxyl groups therein, the molar ratios of said reactants being such that the ratio for phosphate ion to acid is from about 0.5:1 to 3:1; for hydrogen, alkali metal or ammonium ions to phosphate ions, from about 1:1 to 6:1; for non-alkali metal cations to phosphate, from about 0.5:1 to 3:1; for non-alkali metal cations to acid, from about 1:1 to 5:1; and for hydrogen, alkali metal or ammonium ions to acid, from about 0.5:1 to 7:1;

heating said admixture for a sufficient period of time and at a temperature to yield said products.

28. The method as set forth in claim 27 wherein said acid is citric acid.

29. The method as set forth in claim 27 wherein said admixture is maintained at a temperature of room temperature or below during said admixing step.

30. The method as set forth in claim 29 wherein said heating step includes heating said admixture to a temperature of from about 150° F. to 400° F., and thereafter further admixing the admixture at said temperature for a period of from about 10 minutes to 7 hours.

31. The method as set forth in claim 27 including the steps of homogenizing said product and thereafter drying the same to give a dried product.

32. The method as set forth in claim 27 wherein an adjunct is added to said admixture for enhancing the aqueous dispersibility of the resulting compositions.

33. The method as set forth in claim 32 wherein said adjunct is selected from the group consisting of maltodextrins and corn syrup, ranging in D.E. from 1-100, sucrose, dextrose, galactose, arabinose, ribose, xylose, maltose, lactose, raffinose, fructose and polyalcohols, starches, the amino acids, whey, the caseinates, and hydrolyzates of animal, vegetable and marine protein sources.

34. The compositions of matter produced by the process defined in claim 27.

* * * * *